United States Patent
Matsumoto

(10) Patent No.: US 10,166,884 B2
(45) Date of Patent: Jan. 1, 2019

(54) POWER CONDITIONING SYSTEM AND CONTROL METHOD THEREFOR

(71) Applicant: NISSAN MOTOR CO., LTD., Yokohama-shi, Kanagawa (JP)

(72) Inventor: Michihiko Matsumoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/750,950

(22) PCT Filed: Aug. 11, 2015

(86) PCT No.: PCT/JP2015/072795
§ 371 (c)(1),
(2) Date: Feb. 7, 2018

(87) PCT Pub. No.: WO2017/026058
PCT Pub. Date: Feb. 16, 2017

(65) Prior Publication Data
US 2018/0229622 A1 Aug. 16, 2018

(51) Int. Cl.
*H01M 8/04302* (2016.01)
*B60L 11/18* (2006.01)
(Continued)

(52) U.S. Cl.
CPC ..... *B60L 11/1887* (2013.01); *H01M 8/04302* (2016.02); *H01M 8/04753* (2013.01);
(Continued)

(58) Field of Classification Search
CPC ............... H02J 7/242; H01M 2250/20; H01M 2220/20; H01M 8/04753; H01M 16/006;
(Continued)

(56) References Cited

U.S. PATENT DOCUMENTS

2012/0013289 A1   1/2012   Yoshida et al.
2012/0086278 A1   4/2012   Kanie et al.
(Continued)

FOREIGN PATENT DOCUMENTS

CA       2276819 A1    1/2000
CN       107615543 A   1/2018
(Continued)

*Primary Examiner* — Robert Deberadinis
(74) *Attorney, Agent, or Firm* — Foley & Lardner LLP

(57) ABSTRACT

A power conditioning system that includes a fuel cell to be connected to a load, a fuel cell converter connected between the fuel cell and the load, the fuel cell converter converting an output voltage of the fuel cell at a predetermined required voltage ratio, a battery connected in parallel with the fuel cell with respect to the load, the battery serving as a power supply source different from the fuel cell, a battery converter connected between the battery and the load, the battery converter converting an output voltage of the battery at a predetermined required voltage ratio. The power conditioning system includes a converter direct coupling unit configured to directly couple an input side and an output side of the fuel cell converter during startup of the power conditioning system and a fuel cell output voltage increasing unit configured to increase the output voltage of the fuel cell to a predetermined voltage by supplying oxidant gas during startup of the fuel cell.

8 Claims, 16 Drawing Sheets

(51) Int. Cl.
*H01M 16/00* (2006.01)
*H01M 8/04858* (2016.01)
*H01M 8/04746* (2016.01)
*H02M 3/155* (2006.01)
*H02J 7/24* (2006.01)

(52) U.S. Cl.
CPC ... *H01M 8/04873* (2013.01); *H01M 8/04888* (2013.01); *H01M 8/04902* (2013.01); *H01M 16/006* (2013.01); *B60L 2210/10* (2013.01); *B60L 2240/547* (2013.01); *H01M 2220/20* (2013.01); *H01M 2250/20* (2013.01); *H01M 2250/402* (2013.01); *H02J 7/242* (2013.01); *H02M 3/155* (2013.01)

(58) Field of Classification Search
CPC ....... H01M 8/04302; H01M 8/048873; H01M 8/04888; H01M 8/04902; B60L 11/1887
See application file for complete search history.

(56) References Cited

U.S. PATENT DOCUMENTS

| | | |
|---|---|---|
| 2012/0306292 A1 | 12/2012 | Imanishi et al. |
| 2015/0017485 A1 | 1/2015 | Manabe et al. |
| 2018/0123152 A1 | 5/2018 | Matsumoto |

FOREIGN PATENT DOCUMENTS

| | | |
|---|---|---|
| JP | 2010-45889 A | 2/2010 |
| JP | 5434197 B2 | 3/2014 |
| JP | 2014-166109 A | 9/2014 |
| JP | 2015-35840 A | 2/2015 |
| WO | WO 2010/143260 A1 | 12/2010 |

FIG. 16
(a) 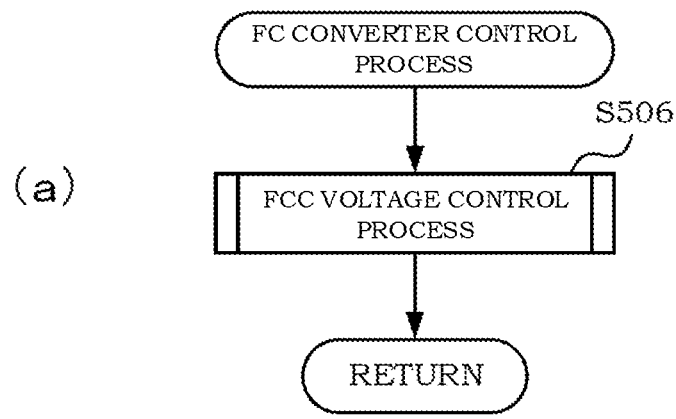
(b) 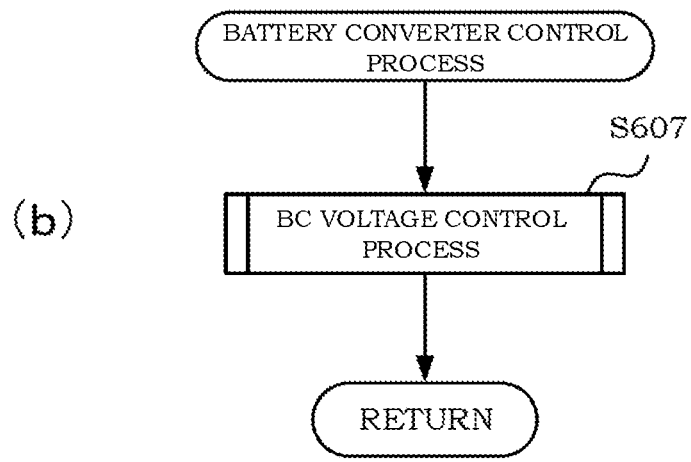

POWER CONDITIONING SYSTEM AND CONTROL METHOD THEREFOR

TECHNICAL FIELD

The present invention relates to a power conditioning system with twin converters and a control method therefor.

BACKGROUND ART

A power conditioning system with a fuel cell is known in which output power of the fuel cell can be supplied to a load connected to the fuel cell by supplying fuel gas (e.g. hydrogen) and oxidant gas (e.g. air) to the fuel cell according to a request of the load.

In the power conditioning system as described above, a high-pressure battery (hereinafter, referred to as a "battery") is provided in parallel with the fuel cell with respect to the load. To synchronize (link) an output voltage of the fuel cell and an output voltage of the battery, a twin converter method is known by which a DC/DC converter for converting an output voltage at a predetermined required voltage ratio is provided on each output side.

In the twin converter method, a control is executed to set an output voltage of the DC/DC converter for battery and an output voltage of the DC/DC converter for fuel cell at a DC link voltage. Here, when the power conditioning system (fuel cell) is started, the DC link voltage is controlled to have a predetermined value by the DC/DC converter for battery.

JP5434197B discloses a control when a fuel cell system with a buck-boost converter for battery is started. In this fuel cell system, an output voltage of a fuel cell is controlled to a high-potential avoiding voltage lower than an open-circuit voltage in consideration of the durability of the fuel cell and the degradation of a battery.

SUMMARY OF INVENTION

Also in the twin converter method, it is thought to execute a similar control. In this case, before the fuel cell is started and coupled to the system via the DC/DC converter for battery and the DC/DC converter for fuel cell, a control may be executed to set a voltage on the output side of the fuel cell to a predetermined value (e.g. high-potential avoiding voltage).

However, in the case of controlling an input side of the DC/DC converter for fuel cell, i.e. the output side of the fuel cell, to the predetermined voltage, overshooting beyond a predetermined value, to which the DC link voltage was set, may occur at a timing at which an output current of the fuel cell increases after the fuel cell is coupled to the system. In that case, the DC/DC converter for fuel cell operates to reduce a voltage on the input side in order to reduce the voltage on the output side.

In such an operation, there is a possibility of hunting of the output current of the fuel cell. Then, there is a problem that the DC link voltage exceeds a breakdown voltage of an electrical component of the power conditioning system and that electrical component breaks down due to an increase of the DC link voltage. Further, there is also a problem that an anode electrode is deteriorated due to the lack of the fuel gas caused by excessive output or hunting of the output current of the fuel cell.

The present invention was developed, focusing on such problems and aims to provide a power conditioning system capable of suppressing the overshooting and undershooting of a DC link voltage by setting a voltage on an output side of a fuel cell to a predetermined voltage during the start-up of the power conditioning system and a control method therefor.

According to an aspect of this invention, there is provided a power conditioning system that includes a fuel cell to be connected to a load, a fuel cell converter connected between the fuel cell and the load, the fuel cell converter converting an output voltage of the fuel cell at a predetermined required voltage ratio, a battery connected in parallel with the fuel cell with respect to the load, the battery serving as a power supply source different from the fuel cell, a battery converter connected between the battery and the load, the battery converter converting an output voltage of the battery at a predetermined required voltage ratio. The power conditioning system includes a converter direct coupling unit configured to directly couple an input side and an output side of the fuel cell converter during startup of the power conditioning system and a fuel cell output voltage increasing unit configured to increase the output voltage of the fuel cell to a predetermined voltage by supplying oxidant gas during startup of the fuel cell.

DESCRIPTION OF EMBODIMENTS

Hereinafter, embodiments of the present invention are described with reference to the accompanying drawings.

(First Embodiment)

Figure 1:
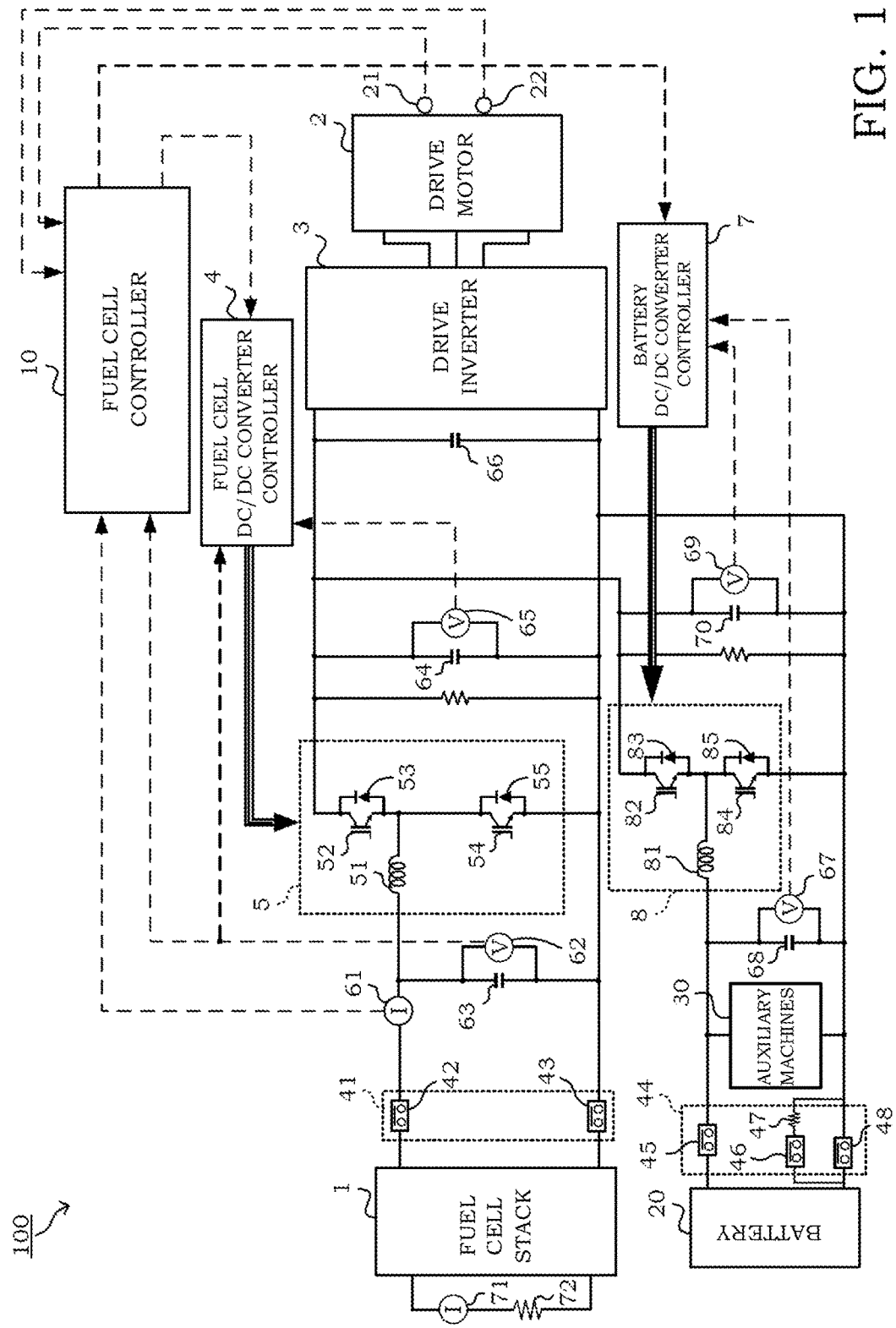
FIG. 1 is a diagram showing an entire configuration of a power conditioning system for fuel cell in a first embodiment of the present invention.

FIG. 1 is a diagram showing an entire configuration of a power conditioning system 100 for fuel cell (hereinafter, merely referred to as the "power conditioning system 100") in a first embodiment of the present invention. The power conditioning system 100 of the present invention is used in a vehicle including at least fuel cells as a drive source. As shown in FIG. 1, this power conditioning system 100 is, for example, mounted in an electric vehicle driven by a drive motor 2. It should be noted that this power conditioning system 100 can be applied to loads in devices other than fuel cell vehicles (electric vehicles utilizing fuel cells) if a fuel cell is used as a drive source, The power conditioning system 100 of the present embodiment includes, as shown in FIG. 1, a fuel cell stack 1, a DC/DC converter 5 for the fuel cell stack 1, a high-voltage battery 20 (hereinafter, referred to as the "battery 20"), auxiliary machines 30 and a DC/DC converter 8 for the battery 20. Further, the power conditioning system 100 includes a fuel cell controller 10 for controlling the entire power conditioning system 100 including the fuel cell stack 1, a fuel cell DC/DC converter controller 4 for controlling the DC/DC converter 5 and a battery DC/DC converter controller 7 for controlling the DC/DC converter 8. Furthermore, the power conditioning system 100 includes the drive motor 2 serving as a load and a drive inverter 3 for switchingly controlling direct-current power input from the fuel cell stack 1 and the battery 20 to alternating-current power to the drive motor 2.

The DC/DC converter 5 for the fuel cell stack 1 is provided between the fuel cell stack 1 and the drive inverter 3 (drive motor 2). This DC/DC converter 5 is for converting an output voltage of the fuel cell stack 1 into an input voltage of the drive inverter 3 at a predetermined voltage ratio. In the present embodiment, the DC/DC converter 5 is a buck-boost converter for stepping up or down the output voltage of the fuel cell stack 1 to a voltage suitable as a drive voltage of the drive motor 2.

In the present embodiment, the DC/DC converter 5 is constituted of a single-phase converter for stepping up and down a voltage in a direction from an output side of the fuel cell stack 1 to an input side of the drive inverter 3. It should be noted that although a case where the DC/DC converter 5 is a single-phase converter is described as an example to facilitate description in the present embodiment, the present invention is not limited to such a configuration. For example, the DC/DC converter 5 may be a multi-phase converter composed of a plurality of layers or a bidirectional DC/DC converter capable of stepping up and down a voltage also in a direction from the input side of the drive inverter 3 to the output side of the fuel cell stack 1.

The DC/DC converter 5 includes a reactor 51, a step-down side switching element 52, a rectifying diode 53, a step-up side switching element 54 and a reflux diode 55. The switching element 52 is connected in reverse parallel to the rectifying diode 53, and the switching element 54 is connected in reverse parallel to the reflux diode 55. These switching elements 52, 54 are, for example, constituted by IGBTs (Insulated Gate Bipolar Transistors).

One end of the reactor 51 is connected to an output terminal on a positive electrode side of the fuel cell stack 1 via a current sensor 61 and the other end is connected to one ends of the switching element 52 and the rectifying diode 53 and one ends of the switching element 54 and the reflux diode 55. The other ends of the switching element 52 and the rectifying diode 53 are connected to an input terminal on a positive electrode side of the drive inverter 3. Further, the other ends of the switching element 54 and the reflux diode 55 are connected to an output terminal on a negative electrode side of the fuel cell stack 1 and an input terminal on a negative electrode side of the drive inverter 3.

A voltage sensor 62 for detecting an output voltage of the fuel cell stack 1 and a capacitor 63 for smoothing the output voltage of the fuel cell stack 1 are connected in parallel between the output terminals of the fuel cell stack 1. In the present embodiment, the capacitor 63 is charged, utilizing power stored in the battery 20 when the vehicle equipped with the power conditioning system 100 is started.

Further, a capacitor 64 for smoothing an output voltage of the DC/DC converter 5 and a voltage sensor 65 for detecting an output voltage of the DC/DC converter 5 (input voltage of the drive inverter 3) are connected in parallel between the output terminals of the DC/DC converter 5.

Furthermore, a capacitor 66 for smoothing an input voltage of the drive inverter 3 is provided between a connection terminal of the output terminal of the DC/DC converter 5 and an output terminal of the DC/DC converter 8 and an input terminal of the drive inverter 3.

The fuel cell stack 1 is connected to the drive motor 2 serving as a load of the power conditioning system 100 via the DC/DC converter 5 and the drive inverter 3. The fuel cell stack 1 is a laminated battery for generating power according to an electrical load such as the drive motor 2 upon receiving the supply of cathode gas (oxidant gas) and anode gas (fuel gas) from unillustrated cathode gas supplying/discharging device and anode gas supplying/discharging gas. For example, several hundreds of fuel cells are laminated in the fuel cell stack 1.

Many devices such as anode gas supply and discharge passages, cathode gas supply and discharge passages, pressure control valves provided in each passage, a cooling water circulation passage, a cooling water pump, a radiator and a cooling device of the fuel cell stack 1 are connected to the fuel cell stack 1. However, these are not shown since having a low relationship with technical features of the present invention.

A first connection/disconnection device 41 capable of enabling and disabling the output of electrical energy generated by the fuel cell stack 1 to the DC/DC converter 5 is provided between the output terminals of the fuel cell stack 1. This first connection/disconnection device 41 is composed of a first positive relay 42 provided on a power line on the positive electrode side of the fuel cell stack 1 and a first negative relay 43 provided on a power line on the negative electrode side of the fuel cell stack 1.

In a system startup process of the power conditioning system 100 to be described later, the first connection/disconnection device 41 is configured to disconnect the fuel cell stack 1 and a subsequent stage by turning off the first positive relay 42 and the first negative relay 43 until the output current of the fuel cell stack 1 is stabilized. The first connection/disconnection device 41 is configured to connect the fuel cell stack 1 to the subsequent stage by turning on the first positive relay 42 and the first negative relay 43 when the output current of the fuel cell stack 1 is stabilized.

The fuel cell stack 1 is provided with a current sensor 71 for detecting an output current of the fuel cell stack 1 on a power line different from the one for the first connection/disconnection device 41, and a predetermined resistor 72 provided in series with the current sensor 71. This current sensor 71 detects the output current of the fuel cell stack 1 while the fuel cells are being started (i.e. in a state where the first connection/disconnection device 41 disables connection to the subsequent stage).

In the present embodiment, a resistance value of the resistor 72 is sufficiently larger than a resistance value of a combined resistance when the side of the DC/DC converter 5 is viewed from the fuel cell stack 1. This causes almost no current to flow through this resistor 72 when the first connection/disconnection device 41 connects the fuel cell stack 1 and the subsequent stage.

It should be noted that, in the present embodiment, an on-off switch may be provided instead of the resistor 72. This on-off switch may be configured to be inversely linked with the first connection/disconnection device 41. Specifically, the on-off switch is controlled to be closed when the first connection/disconnection device 41 disconnects the fuel cell stack 1 and the subsequent stage and opened when the first connection/disconnection device 41 connects the fuel cell stack 1 and the subsequent stage.

The drive motor 2 drives the vehicle equipped with the power conditioning system 100 of the present embodiment. The drive inverter 3 converts direct-current power supplied from the fuel cell stack 1 and battery into alternating-current power and supplies the converted alternating-current power to the drive motor 2. The drive motor 2 is rotationally driven by the alternating-current power supplied by the drive inverter 3 and supplies the rotational energy thereof to the subsequent stage. It should be noted that, although not shown, the drive motor 2 is coupled to drive wheels of the vehicle via a differential and a shaft.

During downhill running or deceleration of the vehicle, regenerative power of the drive motor 2 is supplied to the battery 20 to charge the battery 20 via the drive inverter 3 and the DC/DC converter 8 according to a state of charge of the battery 20. Further, during power running of the vehicle, the drive motor 2 is rotated by generated power of the fuel cell stack 1 and stored power from the battery 20 and the rotational energy thereof is transmitted to the unillustrated drive wheels of the vehicle.

A motor rotation speed detector 21 for detecting a motor rotation speed of the drive motor 2 and a motor torque detector 22 for detecting a motor torque of the drive motor 2 are provided near the drive motor 2. The motor rotation speed and the motor torque of the drive motor 2 detected by these detectors 21, 22 are output to the fuel cell controller 10.

The battery 20 is a chargeable secondary battery and, for example, a lithium ion battery of 300 V (volts). The battery 20 is connected to the auxiliary machines 30 and constitutes a power supply for the auxiliary machines 30. Further, the battery 20 is connected to the drive inverter 3 and the DC/DC converter 5 via the DC/DC converter 8. Specifically, the battery 20 is connected to the drive motor 2 serving as the load of the power conditioning system 100 in parallel with the fuel cell stack 1.

A voltage sensor 67 for detecting an output voltage of the battery 20 and a capacitor 68 for smoothing the output voltage of the battery 20 are connected to the output terminals of the battery 20 in parallel with the auxiliary machines 30.

A second connection/disconnection device 44 capable of enabling and disabling the output of electrical energy stored in the battery to the DC/DC converter 8 is provided between the output terminals of the battery 20. This second connection/disconnection device 44 is composed of a second positive relay 45 provided on a power line on the positive electrode side of the battery 20, a second negative auxiliary relay 46 and an auxiliary resistor 47 provided on a power line on the negative electrode side of the battery 20, and a second negative relay 48.

In the system startup process of the power conditioning system 100 to be described later, the second connection/disconnection device 44 is configured to connect the battery 20 and a subsequent stage via the auxiliary resistor 47 by turning on the second positive relay 45 and the second negative auxiliary relay 46 if a user of the vehicle equipped with the power conditioning system 100 turns on an ignition key (start button). The second connection/disconnection device 44 is configured to connect the battery 20 and the subsequent stage without via the auxiliary resistor 47 by turning off the second negative auxiliary relay 46 and turning on the second positive relay 45 and the second negative relay 48 when a predetermined condition is satisfied.

It should be noted that the above "predetermined condition" is the elapse of a predetermined time, for example, after the output voltage of the DC/DC converter 8 detected by a voltage sensor 69 reaches a predetermined value or larger. In such a situation, an output from the battery 20 needs not be reduced since a DC link voltage is stable.

As shown in FIG. 1, the DC/DC converter 8 for the battery 20 includes a reactor 81, a step-down side switching element 82, a rectifying diode 83, a step-up side switching element 84 and a reflux diode 85. The switching element 82 is connected in reverse parallel to the rectifying diode 83, and the switching element 84 is connected in reverse parallel to the reflux diode 85. These switching elements 82, 84 are, for example, constituted by IGBTs.

One end of the reactor 81 is connected to the output terminal on the positive electrode side of the battery 20 and the other end is connected to one ends of the switching element 82 and the rectifying diode 83 and one ends of the switching element 84 and the reflux diode 85. The other ends of the switching element 82 and the rectifying diode 83 are connected to an input terminal on the positive electrode side of the drive inverter 3. Further, the other ends of the switching element 84 and the reflex diode 85 are connected to the output terminal on the negative electrode side of the battery 20 and the input terminal on the negative electrode side of the drive inverter 3.

A capacitor 70 for smoothing the output voltage of the DC/DC converter 8 and the voltage sensor 69 for detecting the output voltage of the DC/DC converter 8 (input voltage of the drive inverter 3) are connected between the output terminals of the DC/DC converter 8.

The auxiliary machines 30 are components mainly belonging to the fuel cell stack 1 and includes the cathode gas supplying/discharging device and the anode gas supplying/discharging device as described above, an unillustrated cathode compressor, a cooling pump and the like. It should be noted that if various components of the auxiliary machines 30 are light electrical instruments, an unillustrated step-down DC/DC converter may be provided between the battery 20 and the targeted auxiliary machines 30.

Although not shown, the fuel cell controller 10 is configured by a microcomputer including a central processing unit (CPU), a read-only memory (ROM), a random access memory (RAM) and an input/output interface (I/O interface). An output current value and an output voltage value of the fuel cell stack 1 detected by the current sensor 61 and the voltage sensor 62 are input to the fuel cell controller 10.

Further, the fuel cell controller 10 outputs commands for operating the DC/DC converters 5 and 8 respectively to the fuel cell DC/DC converter controller 4 and the battery DC/DC converter controller 7 on the basis of the output current value and the output voltage value of the fuel cell stack 1 input from each sensor 61, 62 and the motor rotation speed and the motor torque of the drive motor 2 input from each detector 21, 22.

The fuel cell DC/DC converter controller 4 controls the DC/DC converter 5 on the basis of the command from the fuel cell controller 10. Specifically, the fuel cell DC/DC converter controller 4 operates the DC/DC converter 5 with the step-down side switching element 52 set at an ON-duty of 100% under a predetermined condition on the basis of the command from the fuel cell controller 10 in the present embodiment. In this way, the DC/DC converter 5 is directly coupled.

Here, in the present embodiment, a "directly coupled state" of the DC/DC converter 5 means a state where the step-down side switching element 52 is kept on. Instead, a path bypassing the switching element 52 and the rectifying diode 53 may be provided and an on-off switch may be provided on that path although not shown. The "directly coupled state" also includes a state where this on-off switch is closed to bypass the switching element 52 and the rectifying diode 53.

An output voltage value of the fuel cell stack 1 detected by the voltage sensor 62 and an output voltage value of the DC/DC converter 5 detected by the voltage sensor 65 are input to the fuel cell DC/DC converter controller 4. The fuel cell DC/DC converter controller 4 switchingly controls each switching element of the DC/DC converter 5 so that a voltage ratio (output voltage/input voltage) of the DC/DC converter 5 reaches a command value from the fuel cell controller 10.

Further, the fuel cell DC/DC converter controller 4 controls the DC/DC converter 5 to step down or up the output voltage of the fuel cell stack 1 to the input voltage (DC link voltage) of the drive inverter 3 on the basis of a voltage request from the drive motor 2 during normal operation of the power conditioning system 100.

The battery DC/DC converter controller 7 controls the DC/DC converter 8 for the battery 20 on the basis of a command from the fuel cell controller 10.

An output voltage value of the battery 20 detected by the voltage sensor 67 and an output voltage value of the DC/DC converter 8 detected by the voltage sensor 69 are input to the battery DC/DC converter controller 7. The battery DC/DC converter controller 7 switchingly controls each switching element of the DC/DC converter 8 so that a voltage ratio (output voltage/input voltage) of the DC/DC converter 8 reaches a command value from the fuel cell controller 10. The fuel cell DC/DC converter controller 4 and the battery DC/DC converter controller 7 respectively control the voltage ratio by the DC/DC converter 5 and the voltage ratio by the DC/DC converter 8 so that the input voltages to the drive inverter 3 are equal.

Figure 2:
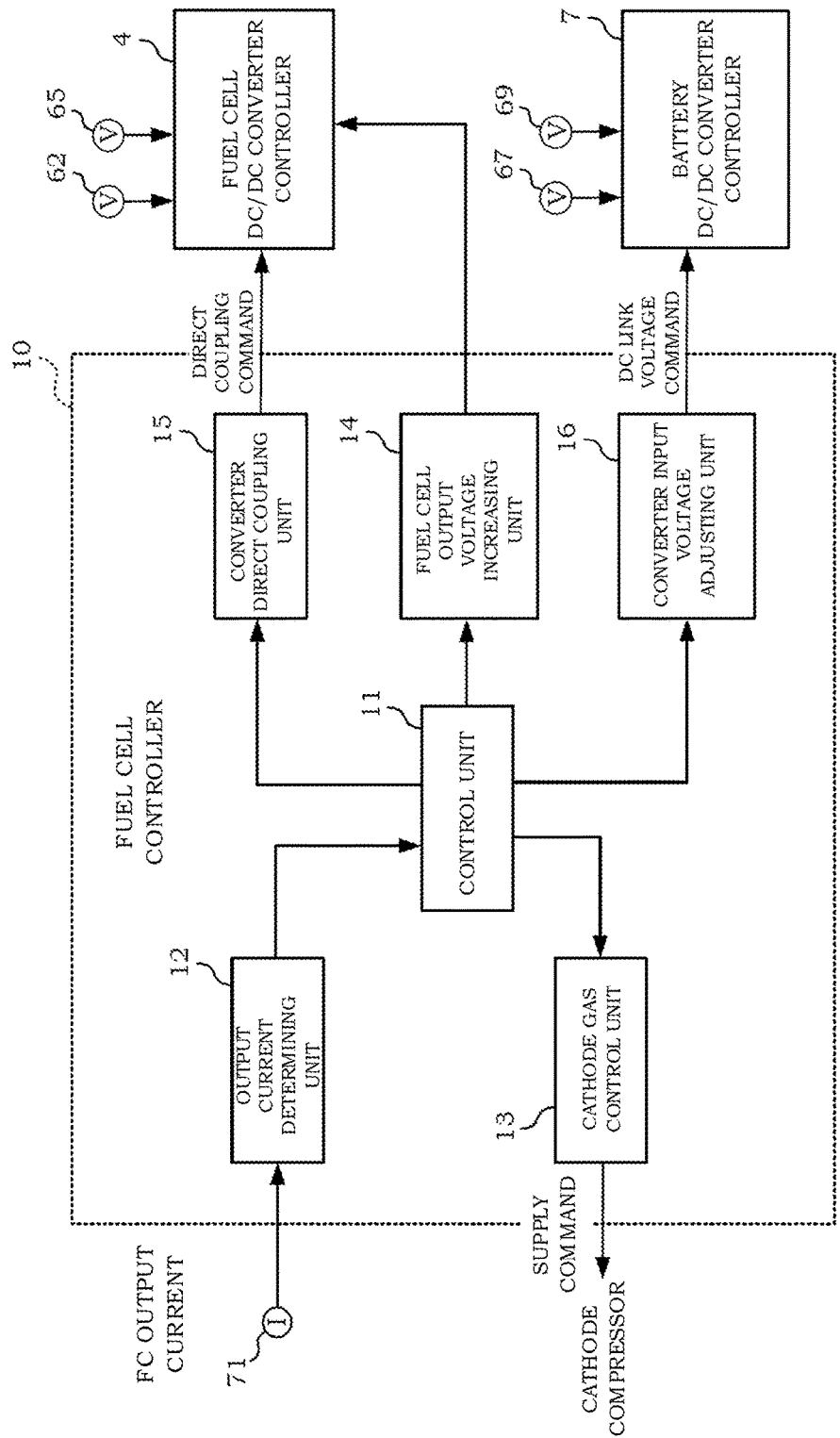
FIG. 2 is a block diagram showing a functional configuration of a fuel cell controller of FIG. 1.

FIG. 2 is a block diagram showing a functional configuration of the fuel cell controller 10 shown in FIG. 1. As shown in FIG. 2, the fuel cell controller 10 of the present embodiment includes a control unit 11, an output current determining unit 12, a cathode gas control unit 13, a fuel cell output voltage increasing unit 14, a converter direct coupling unit 15 and a converter input voltage adjusting unit 16.

The control unit 11 outputs a command necessary for the operation of the present embodiment to each component. The control unit 11 first controls the converter input voltage adjusting unit 16 and the converter direct coupling unit 15 when the power conditioning system 100 is started. Then, the control unit 11 controls the cathode gas control unit 13 and the fuel cell output voltage increasing unit 14 at suitable timings.

The output current determining unit 12 determines whether or not the output current of the fuel cell stack 1 detected by the current sensor 71 has increased to a predetermined value or larger after the startup of the fuel cell stack 1. Here, the "predetermined value" of the output current is a value at which the output current flows from the fuel cell stack 1 even slightly and is, for example, a minimum value of a sensing capability (detection capability) of the current sensor 71. Then, the output current determining unit 12 outputs a determination result to the control unit 11.

The cathode gas control unit 13 controls a cathode gas compressor in the unillustrated cathode gas supplying/discharging device on the basis of a command from the control unit 11. In the present embodiment, a supply command such as a rotation speed of the cathode compressor is output to the cathode gas supplying/discharging device when the fuel cell stack 1 is started during the startup of the power conditioning system 100.

The fuel cell output voltage increasing unit 14 increases the output voltage of the fuel cell stack 1 to a predetermined voltage by supplying oxidant gas to the fuel cell stack 1 during the startup of the fuel cell stack 1 on the basis of a control of the cathode gas control unit 13.

Here, in the present embodiment, the "predetermined voltage" means an operating voltage lower than an open-circuit voltage, capable of power generation from the fuel cell stack 1 and determined in advance to ensure the durability of the fuel cell stack 1. The "predetermined voltage" is, for example, set at a voltage, which is about 90% of the open-circuit voltage.

In the present embodiment, the converter direct coupling unit 15 directly couples the input side and the output side of the DC/DC converter 5 when the power conditioning system 100 is started. By directly coupling the DC/DC converter 5 in this way, a circuit configuration similar to the one in the absence of the DC/DC converter 5 is obtained. Thus, as shown in FIG. 1, each capacitor 70, 64, 63 is connected in parallel with respect to the output of the DC/DC converter 8 for the battery 20. In this way, each capacitor 70, 64, 63 is charged and the entire power conditioning system excluding the fuel cell stack 1 is controlled to the predetermined voltage on the basis of a step-up or step-down operation of the DC/DC converter 8 during the startup of the power conditioning system 100.

The converter input voltage adjusting unit 16 adjusts the input-side voltage of the DC/DC converter 5 to the predetermined voltage by charging the capacitor 63 before the output voltage of the fuel cell stack 1 is increased to the predetermined voltage by the fuel cell output voltage increasing unit 14. Specifically, in the present embodiment, the converter input voltage adjusting unit 16 adjusts the input-side voltage of the DC/DC converter 5 to the predetermined voltage by charging the capacitor 63 using the stored power of the battery 20 by the step-up or step-down operation of the DC/DC converter 8 and the directly coupling operation of the DC/DC converter 5 by the converter direct coupling unit 15.

It should be noted that the converter input voltage adjusting unit 16 may stop the function of the converter direct coupling unit 15 to set the DC/DC converter 5 in an operable state and adjust the input-side voltage of the DC/DC converter 5 to the predetermined voltage by charging the capacitor 63 using the stored power of the battery 20 by the step-up or step-down operation of the DC/DC converter 8 and the step-up or step-down operation of the DC/DC converter 5 in an opposite direction if the DC/DC converter 5 is a bidirectional buck-boost converter.

Further, in the present embodiment, the control unit 11 is configured to increase a voltage control gain of the DC/DC converter 8 for the battery 20 more when the output current of the fuel cell stack 1 is determined to have increased to the predetermined value or larger by the output current determining unit 12 than when the output current is below the predetermined value. That the output current of the fuel cell stack 1 is detected by the current sensor 71 means that the fuel cell stack 1 has been started. When the fuel cell stack 1 is started, the output current from the fuel cell stack 1 sufficiently flows to the drive inverter 3 via the DC/DC converter 5. Thus, even if the voltage control gain of the DC/DC converter 8 for setting the DC link voltage is increased to increase a control speed, the entire power conditioning system 100 can respond.

Here, the reason why the voltage control gain of the DC/DC converter 8 is reduced during the startup of the power conditioning system 100 is briefly described. The voltage control gain of the DC/DC converter 8 can be expressed in a Bode diagram with a horizontal axis representing a frequency (Hz) and a vertical axis representing a gain (dB). When the fuel cell stack 1 is electrically separated from the power conditioning system 100, a gain characteristic of the DC/DC converter 8 mounted in the power conditioning system 100 is known to have two resonance points on the basis of an apparatus configuration of an actual level.

This is described using FIG. 1. If the fuel cell stack 1 is electrically separated from the power conditioning system 100, an LC circuit is constituted by the reactor 81 of the DC/DC converter 8 and two capacitors 70, 64. A resonant frequency of this LC circuit has a first resonance point in the order of 100 Hz. Near this resonance point, an impedance of the DC/DC converter 8 decreases, whereby a large current suddenly flows and the battery 20 is possibly degraded if the voltage control gain is the same as the one during normal operation.

On the other hand, if the voltage control gain is reduced more than necessary, voltage control follow-up at the DC link voltage is reduced. Thus, in a state where the fuel cell stack 1 is not connected to the DC/DC converter 5, a control grain in a resonant frequency band is set to be low in advance to combine an improvement of voltage control follow-up and the suppression of a gain peak by the resonance point.

It should be noted that, in a conventional power conditioning system, an output current flows from the fuel cell stack 1 when oxidant gas and fuel gas are supplied to the fuel cell stack 1. Thus, the capacitor 63 located on the output side of the fuel cell stack 1 is charged and the input-side voltage of the DC/DC converter 5 increases. If the DC/DC converter 5 is a bidirectional DC/DC converter, the DC/DC converter 5 performs a step-up operation to reduce the input-side voltage of the DC/DC converter 5 to a predetermined value (target voltage) if such a situation occurs. Therefore, there has been a problem that the DC link voltage is further increased.

In the present embodiment, since the step-up operation of the DC/DC converter 5 is prevented by directly coupling the DC/DC converter 5 for the fuel cell stack 1, the occurrence of such a problem can be sufficiently suppressed.

Figure 3:
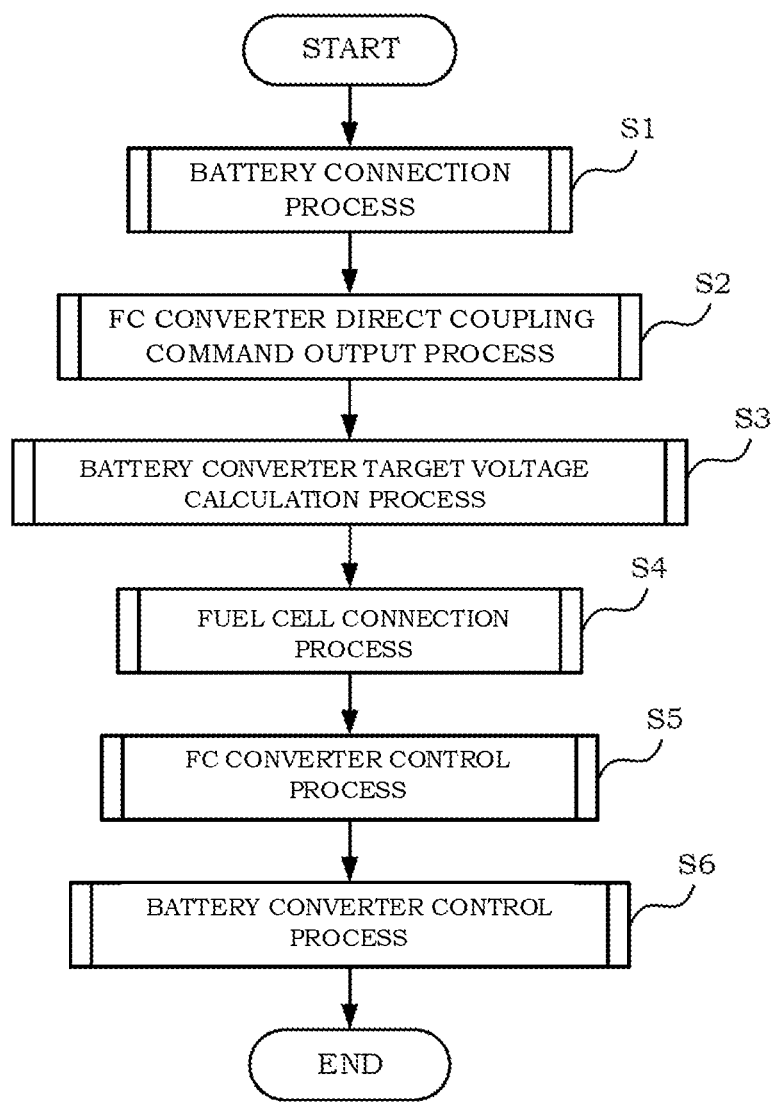
FIG. 3 is a flow chart showing a system startup process performed by the fuel cell controller, a fuel cell DC/DC converter controller and a battery DC/DC converter controller in the first embodiment of the present invention.

Next, an operation during the startup of the power conditioning system 100 in the present embodiment is described with reference to a flow chart of FIG. 3. It should be noted that although the flow chart of FIG. 3 shows the overall operation during the startup of the power conditioning system 100 of the present embodiment, additional step(s) may be included if necessary. Further, a control method for the power conditioning system 100 of the present embodiment constitutes a part of the overall operation during system startup.

FIG. 3 is the flow chart (main process flow) showing the system startup process performed by the fuel cell controller 10, the fuel cell DC/DC converter controller 4 and the battery DC/DC converter controller 7 of the power conditioning system 100 in the first embodiment of the present invention.

A control according to this flow chart is executed during the startup of the power conditioning system 100 of the present embodiment. Here, the "startup of the power conditioning system 100" includes not only the startup of the power conditioning system 100 including the fuel cell stack 1, but also a return from idling stop performed when the vehicle is stopped such as the waiting of the vehicle at a traffic light. It should be noted that a sequence of Steps may be changed within a non-contradictory range.

First, the fuel cell controller 10 performs a battery connection process for connecting the battery 20 in the power conditioning system 100 (Step S1). Subsequently, the fuel cell controller 10 performs an FC converter direct coupling command output process for directly coupling the DC/DC converter 5 for the fuel cell stack 1 (Step S2).

Subsequently, the fuel cell controller 10 performs a battery converter target voltage calculation process for calculating a target voltage of the DC/DC converter 8 for the battery 20 (Step S3) and performs a fuel cell connection process for connecting the fuel cell stack 1 to the DC/DC converter 5 (Step S4).

Subsequently, the fuel cell controller 10 performs an FC converter control process for directly coupling the DC/DC converter 5 for the fuel cell stack 1 and controlling the DC/DC converter 5 in a normal operation mode after the startup of the power conditioning system 100 (Step S5). Subsequently, the fuel cell controller 10 performs a battery converter control process for controlling the DC/DC converter 8 during or after the startup of the power conditioning system 100 (Step S6).

Then, the fuel cell controller 10, the fuel cell DC/DC converter controller 4 and the battery DC/DC converter controller 7 end the system startup process in the present embodiment shown in FIG. 3.

Next, each subroutine of FIG. 3 is described with reference to a flow chart.

Figure 4:
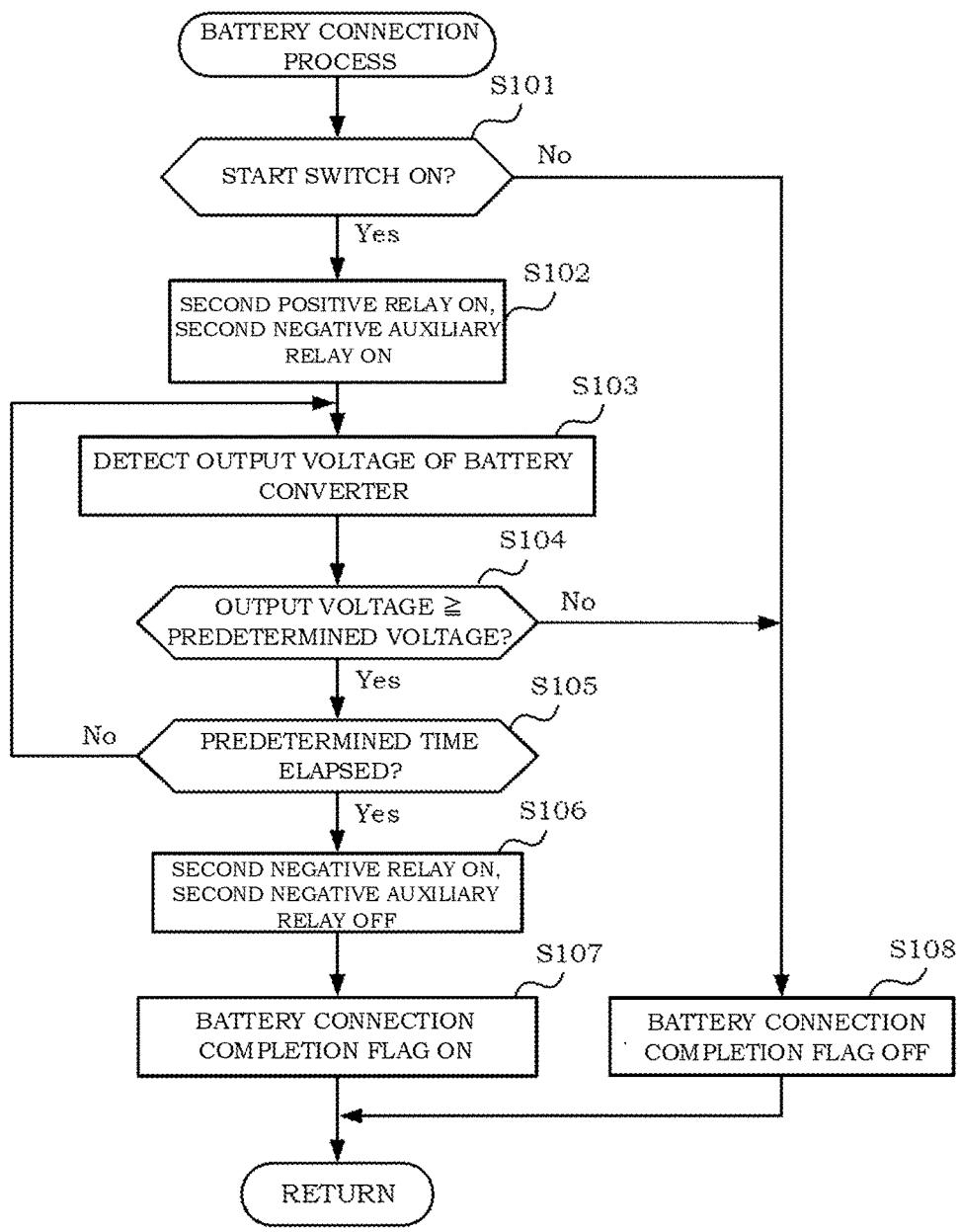
FIG. 4 is a flow chart showing a battery connection process performed by the fuel cell controller.

FIG. 4 is a flow chart showing the battery connection process, which is a subroutine corresponding to Step S1 of FIG. 3 and performed by the fuel cell controller 10.

In this battery connection process, the fuel cell controller 10 first determines whether or not the start switch of the vehicle equipped with the power conditioning system 100 has been turned on (Step S101). It should be noted that, as described above, whether or not the ignition key has been turned on may be determined in a vehicle using not the start switch, but the ignition key.

If the start switch is determined not to be on, the fuel cell controller 10 turns off a battery connection completion flag (Step S108), ends this battery connection process and returns to the main process flow. On the other hand, if the start switch is determined to be on, the fuel cell controller 10 turns on the second positive relay 45 and the second negative auxiliary relay 46 of the connection/disconnection device 44 (Step S102). In this way, the battery 20 is electrically connected to the DC/DC converter 8 via the auxiliary resistor 47. Thus, the input-side voltage of the DC/DC converter 8 gradually increases due to the charging of the capacitor 68.

Subsequently, the fuel cell controller 10 detects the output voltage of the DC/DC converter 8 using the voltage sensor 69 (Step S103).

Then, the fuel cell controller 10 determines whether or not the detected output voltage is equal to or higher than the predetermined voltage (Step S104). If the output voltage is determined to be below the predetermined voltage, the fuel cell controller 10 turns off the battery connection completion flag (Step S108), ends this battery connection process and returns to the main process flow.

On the other hand, if the output voltage is determined to be equal to or higher than the predetermined voltage, the fuel cell controller 10 determines whether or not a time after the output voltage has first reached the predetermined voltage or higher has exceeded a predetermined time (Step S105). If that time is determined not to have exceeded the predetermined time, the fuel cell controller 10 repeats the processings of Steps S103 to S105 until that time reaches the predetermined time.

If that time is determined to have exceeded the predetermined time, the fuel cell controller 10 turns off the second negative auxiliary relay 46 of the connection/disconnection device 44 and turns on the second negative relay 48 (Step S106). By the elapse of the predetermined time, the input-side voltage of the DC/DC converter 8 reaches a storage voltage of the battery 20. Since this enables the stored power of the battery 20 to be supplied to a subsequent stage without via the auxiliary resistor 47, voltage control follow-up can be enhanced.

Subsequently, the fuel cell controller 10 turns on the battery connection completion flag (Step S107), ends this battery connection process and returns to the main process flow.

Figure 5:
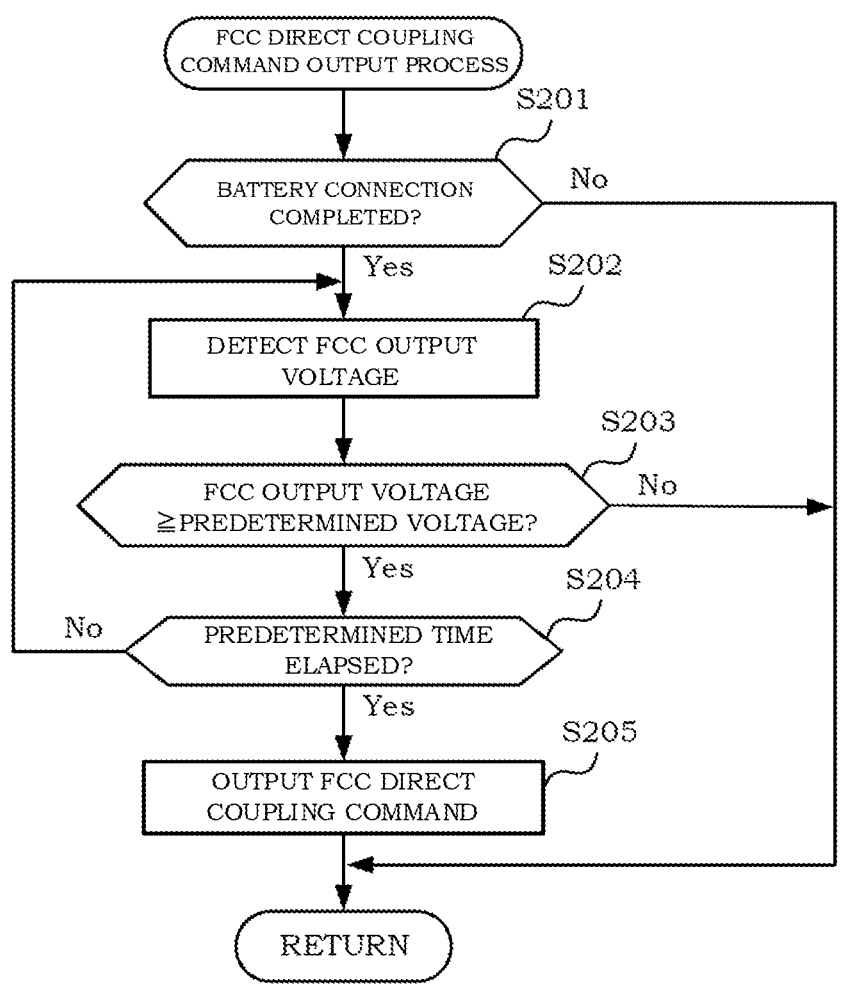
FIG. 5 is a flow chart showing an FCC direct coupling command output process performed by the fuel cell controller.

FIG. 5 is a flow chart showing the FCC direct coupling command output process, which is a subroutine corresponding to Step S2 of FIG. 3 and performed by the fuel cell controller 10.

In this FCC direct coupling command output process, the fuel cell controller 10 first determines on the basis of the battery connection completion flag whether or not the connection of the battery 20 to the subsequent stage has been completed (Step S201). If the connection of the battery 20 is determined not to have been completed, the fuel cell controller 10 ends this FCC direct coupling command output process and returns to the main process flow.

On the other hand, if the connection of the battery 20 is determined to have been completed, the fuel cell controller 10 detects the output voltage of the DC/DC converter 5 for the fuel cell stack 1 (Step S202).

Then, the fuel cell controller 10 determines whether or not the detected output voltage is equal to or higher than the predetermined voltage (Step S203). If the output voltage is determined to be below the predetermined voltage, the fuel cell controller 10 ends this FCC direct coupling command output process and returns to the main process flow.

On the other hand, if the output voltage is determined to be equal to or higher than the predetermined voltage, the fuel cell controller 10 determines whether or not the time after the output voltage has first reached the predetermined voltage or higher has exceeded the predetermined time (Step S204). If that time is determined not to have exceeded the predetermined time, the fuel cell controller 10 repeats the processings of Steps S202 to S204 until that time reaches the predetermined time.

If that time is determined to have exceeded the predetermined time, the fuel cell controller 10 outputs an FCC direct coupling command to the fuel cell DC/DC converter controller 4 (Step S205), ends this FCC direct coupling command output process and returns to the main process flow. Here, the "FCC direct coupling command" is a command for directly coupling the DC/DC converter 5 for the fuel cell stack 1 as described above. The fuel cell DC/DC converter controller 4 outputs a PWM signal having an ON-duty of 100% to the switching element 52 of the DC/DC converter 5 on the basis of this FCC direct coupling command, whereby the switching element 52 is constantly set in an ON state.

Figure 6:
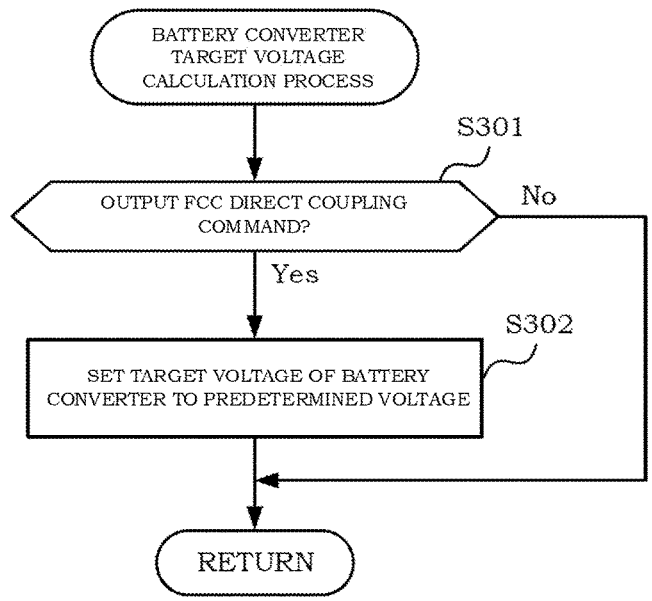
FIG. 6 is a flow chart showing a battery converter target voltage calculation process performed by the fuel cell controller.

FIG. 6 is a flow chart showing the battery converter target voltage calculation process, which is a subroutine corresponding to Step S3 of FIG. 3 and performed by the fuel cell controller 10.

In this battery converter target voltage calculation process, the fuel cell controller 10 first determines whether or not the FCC direct coupling command has been output in Step S205 of the FCC direct coupling command output process (Step S301). If the FCC direct coupling command is determined not to have been output, the fuel cell controller 10 ends this battery converter target voltage calculation process and returns to the main process flow.

On the other hand, if the FCC direct coupling command is determined to have been output, the fuel cell controller 10 sets a target voltage (target output voltage) of the DC/DC converter 8 for the battery 20 to the predetermined voltage (Step S302), ends this battery converter target voltage calculation process and returns to the main process flow.

Figure 7:
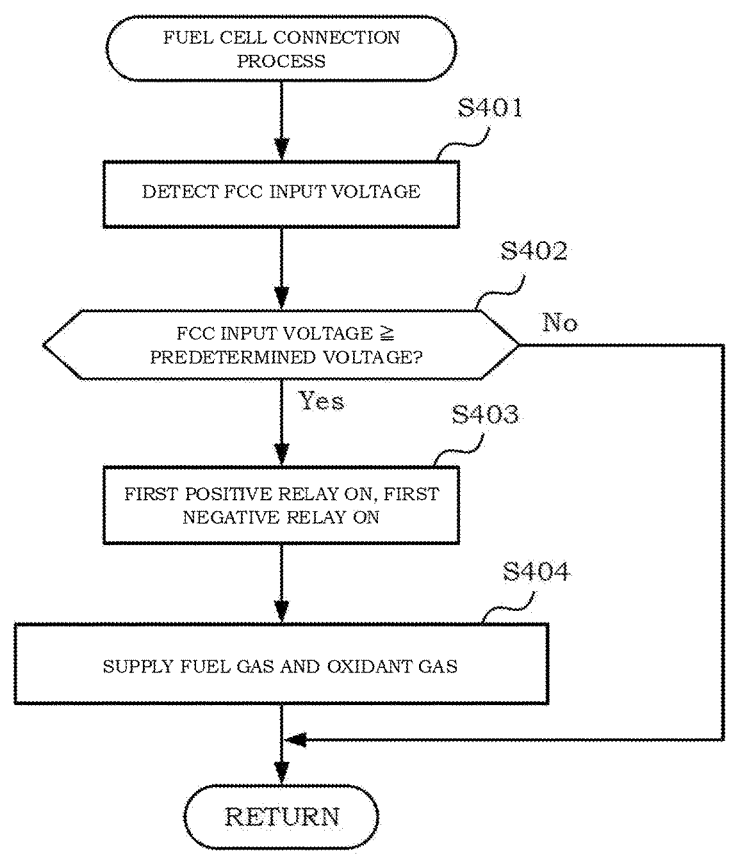
FIG. 7 is a flow chart showing a fuel cell connection process performed by the fuel cell controller.

FIG. 7 is a flow chart showing the fuel cell connection process, which is a subroutine corresponding to Step S4 of FIG. 3 and performed by the fuel cell controller 10.

In this fuel cell connection process, the fuel cell controller 10 first detects the input voltage of the DC/DC converter 5 for the fuel cell stack 1 (Step S401). Here, if the direct coupling command has been already output in the FC converter direct coupling command output process, the stored power of the battery 20 is introduced to the capacitor 63 via the DC/DC converter 8 and the reactor 51. Thus, a voltage between both terminals of the capacitor 63, i.e. the input-side voltage of the DC/DC converter 5 is increasing.

Subsequently, the fuel cell controller 10 determines whether or not this input voltage is equal to or higher than the predetermined voltage (Step S402). If the input voltage is determined to be below the predetermined voltage, the fuel cell controller 10 ends this fuel cell connection process and returns to the main process flow.

On the other hand, if the input voltage is determined to be equal to or higher than the predetermined voltage, the fuel cell controller 10 turns on each of the first positive relay 42 and the first negative relay 43 of the first connection/disconnection device 41 (Step S403). In this way, the fuel cell stack 1 is electrically connected to the subsequent stage to charge the capacitor 63. It should be noted that, during the startup of the power conditioning system 100, the first positive relay 42 and the first negative relay 43 are off and the fuel cell stack 1 is electrically disconnected from the subsequent stage.

Subsequently, the fuel cell controller 10 starts the supply of the fuel gas and the oxidant gas to the fuel cell stack 1 by the unillustrated anode gas supplying/discharging device and cathode gas supplying/discharging device (Step S404), ends this fuel cell connection process and returns to the main process flow. It should be noted that a power generation control of the fuel cell stack 1 is executed by the fuel cell controller 10 on the basis of required power of the drive motor 2 serving as the load and a wet/dry state of unillustrated electrolyte membranes in the fuel cell stack 1.

Figure 8:
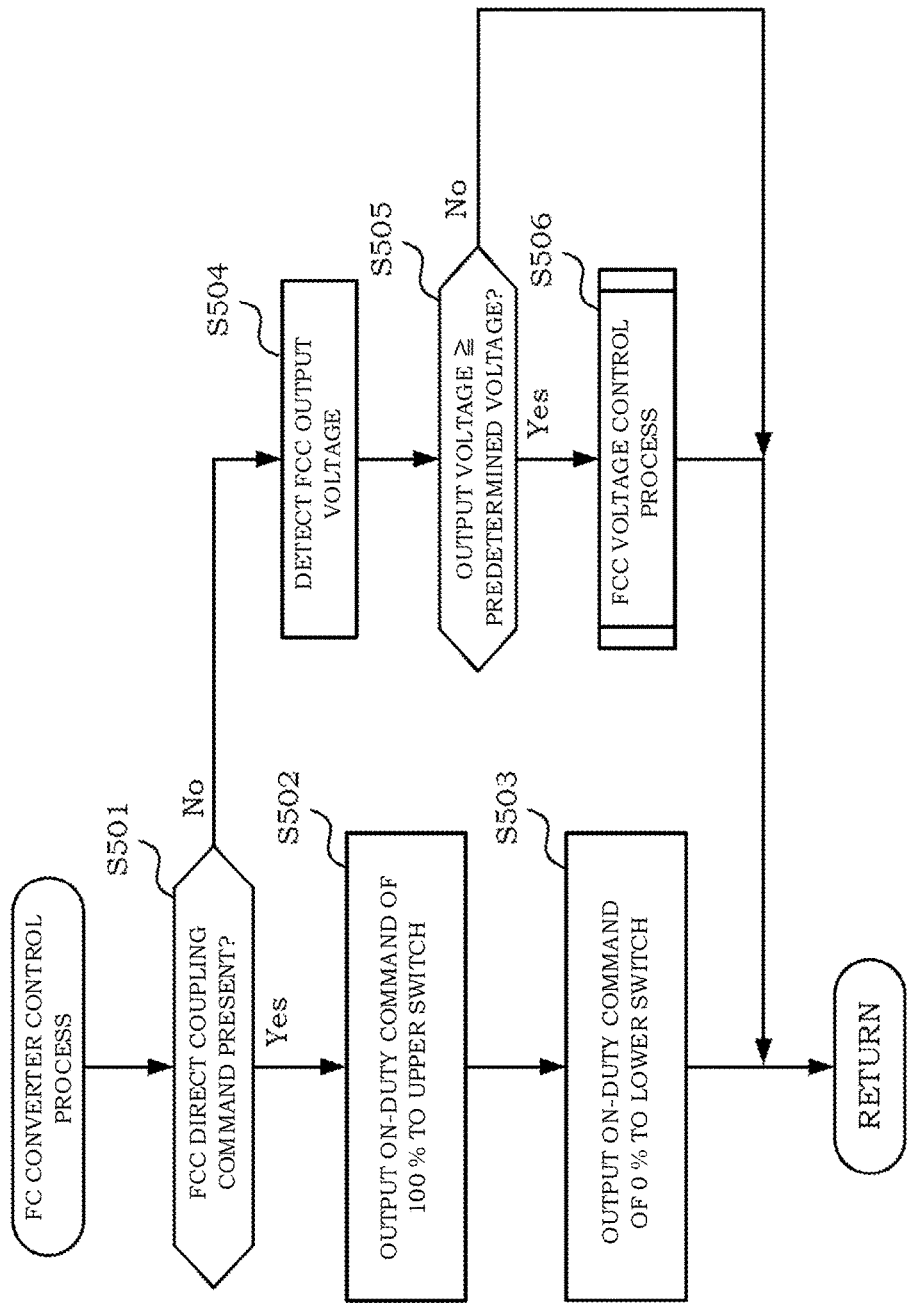
FIG. 8 is a flow chart showing an FC converter control process performed by the fuel cell controller.

FIG. 8 is a flow chart showing the FC converter control process, which is a subroutine corresponding to Step S5 of FIG. 3 and performed by the fuel cell controller 10.

In this FC converter control process, the fuel cell controller 10 first determines whether or not the FCC direct coupling command has been output in Step S205 of the FCC direct coupling command output process (Step S501).

If the FCC direct coupling command is determined to have been output, the fuel cell controller 10 outputs an ON-duty command of 100% to the switching element 52 of the DC/DC converter 5 (Step S502) and outputs an ON-duty command of 0% to the switching element 54 (Step S503). Then, the fuel cell controller 10 ends this FC converter control process and returns to the main process flow.

On the other hand, if the FCC direct coupling command is determined not to have been output, the fuel cell controller 10 detects the output voltage of the DC/DC converter 5 for the fuel cell stack 1 (Step S504). Then, the fuel cell controller 10 determines whether or not this output voltage is equal to or higher than the predetermined voltage (Step S505). If the output voltage is determined to be below the predetermined voltage, the fuel cell controller 10 ends this FC converter control process and returns to the main process flow.

On the other hand, if the output voltage is determined to be equal to or higher than the predetermined voltage, the fuel cell controller 10 causes the fuel cell DC/DC converter controller 4 to perform an FC voltage control process (Step S506), ends this FC converter control process and returns to the main process flow.

It should be noted that a case where the FC converter control process shown in FIG. 8 is performed by the fuel cell controller 10 has been described in the present embodiment. However, the present invention is not limited to such a configuration. For example, the fuel cell DC/DC converter controller 4 may directly perform this FC converter control process.

Figure 9:
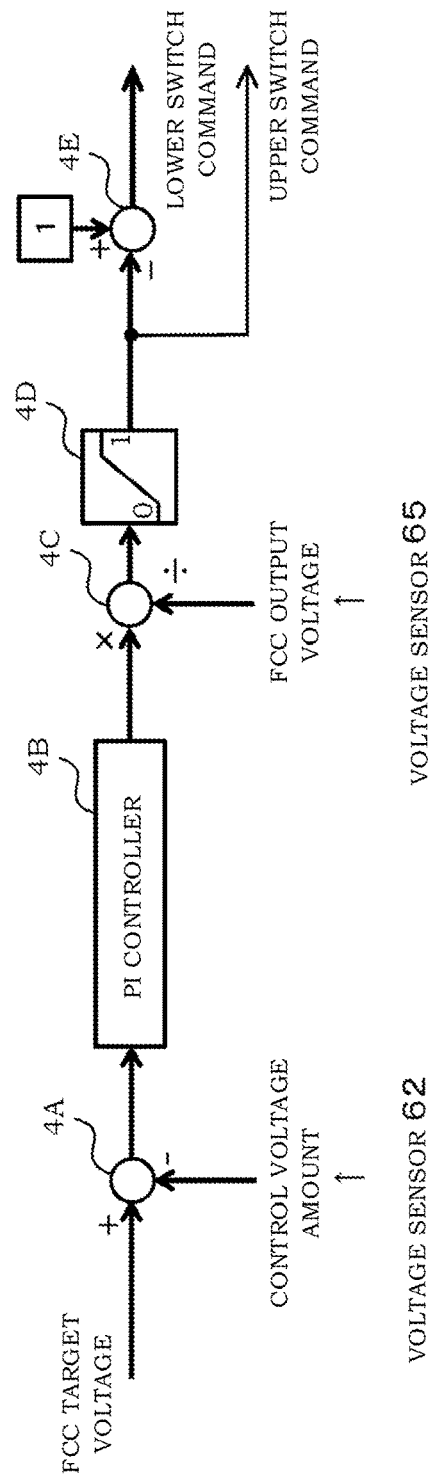
FIG. 9 is a control block diagram showing an FCC voltage control process performed by the fuel cell DC/DC converter controller.

FIG. 9 is a control block diagram showing the FCC voltage control process, which is a subroutine corresponding to Step S506 of FIG. 8 and performed by the fuel cell DC/DC converter controller 4. As shown in FIG. 9, the fuel cell DC/DC converter controller 4 includes a subtractor 4A for subtracting a second input from a first input, a PI controller 4B for PI-controlling an input value, a divider 4C for dividing a first input by a second input, a limiter 4D for limiting an input value to a value within a predetermined range and a subtractor 4E for subtracting a second input from a first input.

First, a control voltage amount detected by the voltage sensor 62 for detecting the output voltage of the fuel cell stack 1 is subtracted from a target voltage to be stepped up or down by the DC/DC converter 5 by the subtractor 4A.

Subsequently, an output value of the subtractor 4A is PI-controlled by the PI controller 4B and an obtained value is output to the divider 4C.

Subsequently, an output value of the PI controller 4B is divided by an FCC output voltage detected by the voltage sensor 65 for detecting the output voltage of the DC/DC converter 5 by the divider 4C and that result is output to the limiter 4D.

Here, if the output voltage of the fuel cell stack 1 is stepped up by the DC/DC converter 5, an output value of the divider 4C is equal to or smaller than 1. On the other hand, if the output voltage of the fuel cell stack 1 is higher than the output voltage of the DC/DC converter 5, the output value of the divider 4C is equal to or larger than 1. The limiter 4D of the present embodiment limits a value below 0 to 0 and limits a value larger than 1 to 1. The limiter 4D outputs an obtained value to a subsequent stage.

Finally, an output value of the limiter 4D is subtracted from 1 by the subtractor 4E. Then, the fuel cell DC/DC converter controller 4 outputs an output value (value of 0 to 1) of the subtractor 4E as a PWM signal to the switching element 54 and outputs the output value (value of 0 to 1 which gives 1 when being added to the output value of the subtractor 4E) of the limiter 4D as a PWM signal to the switching element 52.

In the present embodiment, the fuel cell DC/DC converter controller 4 calculates the PWM signals for the switching elements 52, 54 for switching control on the basis of the above calculation process. It should be noted that the fuel cell DC/DC converter controller 4 may include an analog circuit by a hardware configuration to perform this calculation process or, instead, the PWM signals may be calculated by executing a software program stored in an unillustrated memory.

Figure 10:
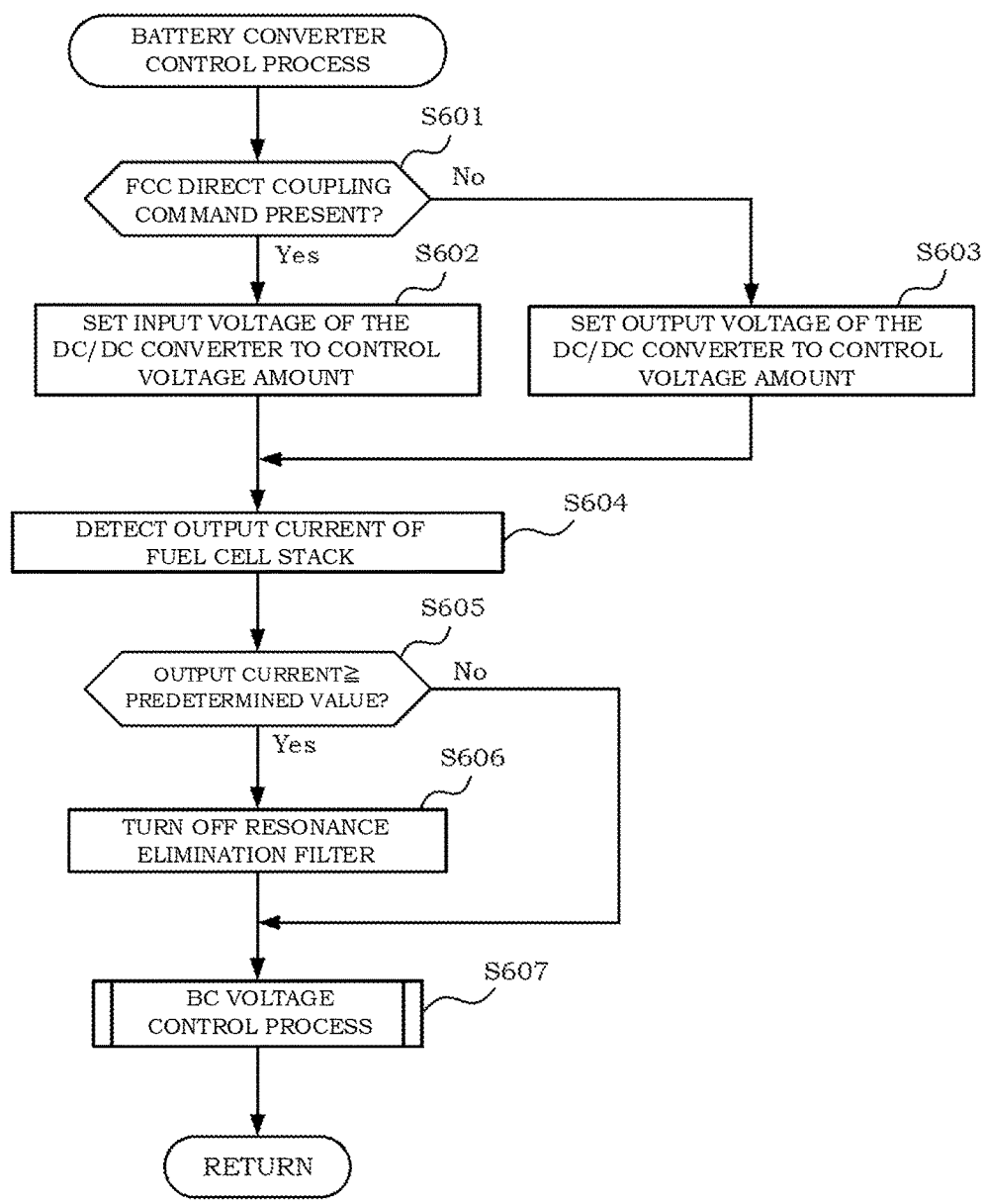
FIG. 10 is a flow chart showing a battery converter control process performed by the fuel cell controller.

FIG. 10 is a flow chart showing the battery converter control process, which is a subroutine corresponding to Step S6 of FIG. 3 and performed by the fuel cell controller 10.

In this battery converter control process, the fuel cell controller 10 first determines whether or not the FCC direct coupling command has been output in Step S205 of the FCC direct coupling command output process (Step S601).

If the FCC direct coupling command is determined to have been output, the fuel cell controller 10 sets the input voltage of the DC/DC converter 5 to the control voltage amount (Step S602). On the other hand, if the FCC direct coupling command is determined not to have been output, the fuel cell controller 10 sets the output voltage of the DC/DC converter 5 to the control voltage amount (Step S603).

Subsequently, the fuel cell controller 10 detects the output current of the fuel cell stack 1 using the current sensor 71 or 61 (Step S604). Then, the fuel cell controller 10 determines whether or not the detected output current value is equal to or larger than a predetermined value (Step S605). It should be noted that this "predetermined value" is a value at which the output current flows from the fuel cell stack 1 even slightly and is, for example, a minimum value of a sensing capability (detection capability) of the current sensor 71 or 61.

If the detected output current value is determined to be equal to or larger than the predetermined value, the fuel cell controller 10 turns off a function of a resonance elimination filter to be described later (Step S606). On the other hand, if the detected output current value is determined to be below the predetermined value, the fuel cell controller 10 directly proceeds to Step S607.

Subsequently, the fuel cell controller 10 causes the battery DC/DC converter controller 7 to perform a BC voltage control process (Step S607), ends this battery converter control process and returns to the main process flow.

It should be noted that a case where the battery converter control process shown in FIG. 10 is performed by the fuel cell controller 10 has been described in the present embodiment. However, the present invention is not limited to such a configuration. For example, the battery DC/DC converter controller 7 may directly perform this FC converter control process.

Figure 11:
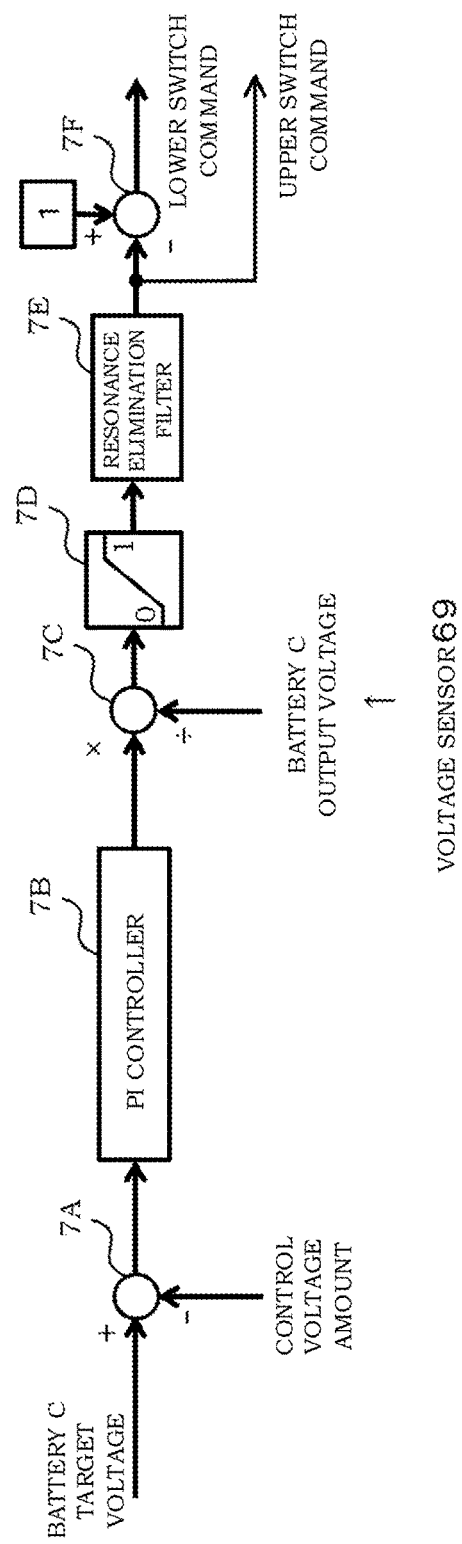
FIG. 11 is a control block diagram showing a BC voltage control process performed by the battery DC/DC converter controller.

FIG. 11 is a control block diagram showing the BC voltage control process performed by the battery DC/DC converter controller 7. As shown in FIG. 11, the battery DC/DC converter controller 7 includes a subtractor 7A for subtracting a second input from a first input, a PI controller 7B for PI-controlling an input value, a divider 7C for dividing a first input by a second input, a limiter 7D for limiting an input value to a value within a predetermined range, a resonance elimination filter 7E and a subtractor 7F for subtracting a second input from a first input.

Here, the resonance elimination filter 7E is, for example, constituted of a low-pass filter such as a moving average filter. The resonance elimination filter 7E is a member for reducing a gain characteristic in a resonant frequency band of a resonant circuit composed of the reactor 81 of the DC/DC converter 8 and the capacitors 64, 70. It should be noted that, in the present embodiment, the function of the resonance elimination filter is turned off if the output current of the fuel cell stack 1 reaches a predetermined value or larger as shown in the flow chart of FIG. 10.

First, the input voltage or output voltage of the DC/DC converter 8, which is the control voltage amount set in Step S602 or S603, is subtracted from the target voltage to be stepped up or down by the DC/DC converter 5 by the subtractor 7A. Subsequently, an output value of the subtractor 7A is PI-controlled by the PI controller 7B and an obtained value is output to the divider 7C.

Subsequently, an output of the PI controller 7B is divided by a battery C output voltage detected by the voltage sensor 69 for detecting the output voltage of the DC/DC converter 8 by the divider 7C and that result is output to the limiter 7D.

The limiter 7D limits a value below 0 to 0 and limits a value larger than 1 to 1, and outputs an obtained value to a subsequent stage. The resonance elimination filter 7E removes a high-frequency component in the output of the limiter 7D.

Finally, an output value of the resonance elimination filter 7E is subtracted from 1 by the subtractor 7F. Then, the battery DC/DC converter controller 7 outputs an output value (value of 0 to 1) of the subtractor 7F as a PWM signal to the switching element 84 and outputs the output value (value of 0 to 1 which gives 1 when being added to the output value of the subtractor 7F) of the resonance elimination filter 7E as a PWM signal to the switching element 82.

In the present embodiment, the battery DC/DC converter controller 7 calculates the PWM signals for the switching elements 82, 84 for switching control on the basis of the above calculation process. It should be noted that the battery DC/DC converter controller 7 may include an analog circuit by a hardware configuration to perform this calculation process or, instead, the PWM signals may be calculated by executing a software program stored in an unillustrated memory.

As described above, the power conditioning system 100 of the present embodiment is a power conditioning system with two converters and includes the fuel cell stack 1 (fuel cell) to be connected to the drive motor 2 serving as the load, the DC/DC converter 5 for the fuel cell stack 1 (fuel cell converter) connected between the fuel cell stack 1 and the drive motor 2 and configured to convert the output voltage of the fuel cell stack 1 at the predetermined required voltage ratio, the battery 20 connected in parallel with the fuel cell stack 1 with respect to the drive motor 2 and serving as a power supply source different from the fuel cell stack 1, and the DC/DC converter 8 for the battery 20 (battery converter) connected between the battery 20 and the drive motor 2 and configured to convert the output voltage of the battery 20 at the predetermined required voltage ratio. Also, the power conditioning system 100 of the present embodiment is configured to further include the converter direct coupling unit 15 configured to directly couple the input side and the output side of the DC/DC converter 5 for the fuel cell stack 1 during the startup of the power conditioning system 100, and the fuel cell output voltage increasing unit 14 configured to increase the output voltage of the fuel cell stack 1 to the predetermined voltage by supplying the oxidant gas during the startup of the fuel cell stack 1. According to the power conditioning system 100 of the present embodiment, the step-up/down function of the DC/DC converter 5 is not exhibited by directly coupling the DC/DC converter 5 during the startup of the power conditioning system 100. When the DC link voltage is adjusted via the DC/DC converter 8 for the battery 20, the capacitor 63 is charged through the directly coupled DC/DC converter 5, whereby the voltage on the output side of the fuel cell stack 1 can be set at the predetermined voltage equal to the DC link voltage. In that state, the output voltage of the fuel cell stack 1 is increased to reach this predetermined voltage, wherefore the overshooting of the DC link voltage conventionally occurring during the startup of the power conditioning system 100 and the undershooting thereof occurring as a reaction to the overshooting can be effectively reduced.

Further, since the DC/DC converter 5 is directly coupled during the startup in the power conditioning system 100 of the present embodiment, the DC/DC converter 5 does not step up the output voltage of the fuel cell stack 1. Thus, even if the DC link voltage becomes higher than the predetermined voltage or the input-side voltage of the DC/DC converter 5 becomes higher than the predetermined voltage, hunting by the DC/DC converter 5 can be prevented. Since the supply of the anode gas and the cathode gas to the fuel cell stack 1 is not adversely affected by this and the output current is not largely extracted according to the request of the DC/DC converter 5, the damage of each electrode and each electrolyte membrane in the fuel cell stack 1 can be effectively suppressed.

The power conditioning system 100 of the present embodiment is configured to further include the converter input voltage adjusting unit 16 configured to adjust the input-side voltage of the DC/DC converter 5 for the fuel cell stack 1 to the predetermined voltage before the output voltage of the fuel cell stack 1 is increased to the predetermined voltage by the fuel cell output voltage increasing unit 14. This can more effectively reduce the overshooting of the DC link voltage conventionally occurring during the startup of the power conditioning system 100 and the undershooting thereof occurring as a reaction to the overshooting.

In the power conditioning system 100 of the present embodiment, the converter input voltage adjusting unit 16 is configured to adjust the input-side voltage of the DC/DC converter 5 for the fuel cell stack 1 to the predetermined voltage using the stored power of the battery 20 by means of the DC/DC converter 8 for the battery 20 and the converter direct coupling unit 15. In this case, a control amount of the DC/DC converter 8, i.e. a voltage value on the output side corresponding to the predetermined required voltage ratio, may be set as the input-side voltage of the DC/DC converter 5 (output-side voltage of the fuel cell stack 1). Since a control is executed with the high-potential avoiding voltage of the fuel cell stack 1 set as a target in this way, the input-side voltage of the DC/DC converter 5 can be quickly controlled to the predetermined voltage. This can further suppress the amount of overshooting of the output-side voltage of the DC/DC converter 5, with the result that the degradation of the fuel cell stack 1 can be more effectively suppressed as described above.

In the power conditioning system 100 of the present embodiment, the converter input voltage adjusting unit 16 may be configured to stop the function of the converter direct coupling unit 15 and adjust the input-side voltage of the DC/DC converter 5 for the fuel cell stack 1 to the predetermined voltage using the stored power of the battery 20 by the DC/DC converter 8 for the battery 20 and the DC/DC converter 5 for the fuel cell stack 1. Particularly, if the DC/DC converter 5 is a bidirectional buck-boost converter, the input-side voltage of the DC/DC converter 5 can be more quickly adjusted to the predetermined voltage not by the directly coupled state of the DC/DC converter 5, but by the operation of the DC/DC converter 5.

The power conditioning system 100 of the present embodiment further includes the current sensor 71 configured to detect the output current of the fuel cell stack 1 during the startup of the fuel cell stack 1 and the output current determining unit 12 configured to determine whether or not the output current detected by the current sensor 71 has increased to the predetermined value or larger after the startup of the fuel cell stack 1, and the voltage control gain of the DC/DC converter 8 for the battery 20 is increased more when the output current is determined to have increased to the predetermined value or larger by the output current determining unit 12 than when the output current is below the predetermined value. By adopting such a configuration, a timing at which the output of the current from the fuel cell stack 1 to the DC/DC converter 5 is started can be judged and the voltage control gain of the DC/DC converter 8 for the battery 20 is set higher at the timing of the output start. In this way, it is possible to establish the DC link voltage and increase a responsiveness control speed while suppressing the overshooting of the output-side voltage of the DC/DC converter 5.

In the power conditioning system 100 of the present embodiment, the converter direct coupling unit 15 is configured to directly couple the DC/DC converter 5 for the fuel cell stack 1 and simultaneously increase the input-side voltage and the output-side voltage of the DC/DC converter 5 for the fuel cell stack 1 to the predetermined voltage using the stored power of the battery 20 during the startup of the power conditioning system 100. By adopting such a configuration, the input-side voltage and the output-side voltage can be increased by simultaneously charging the capacitor 63 on the input side and the capacitor 64 on the output side of the DC/DC converter 5 during the startup of the power conditioning system 100. Since this enables the predetermined voltage to be more quickly established during the startup of the power conditioning system 100, a time until the supply of the oxidant gas and the fuel gas to the fuel cell stack 1 can be shortened. Thus, a startup time of the entire power conditioning system 100 can be shortened.

(Second Embodiment)

Hereinafter, a second embodiment of the present invention is described mainly on points of difference from the first embodiment. It should be noted that since the overall configuration of the power conditioning system 100 and the functional configuration of the fuel cell controller 10 are similar, these configurations are described using FIGS. 1 and 2.

In the first embodiment, the fuel cell DC/DC converter controller 4 and the battery DC/DC converter controller 7 are controlled by the fuel cell controller 10 to set the output-side voltage of the fuel cell stack 1 to the predetermined voltage during the startup of the power conditioning system 100. In the present embodiment, an output-side voltage of a fuel cell stack 1 is set to a predetermined voltage during the startup of a power conditioning system 100 without requiring special control modes for a fuel cell DC/DC converter controller 4 and a battery DC/DC converter controller 7.

Figure 12:
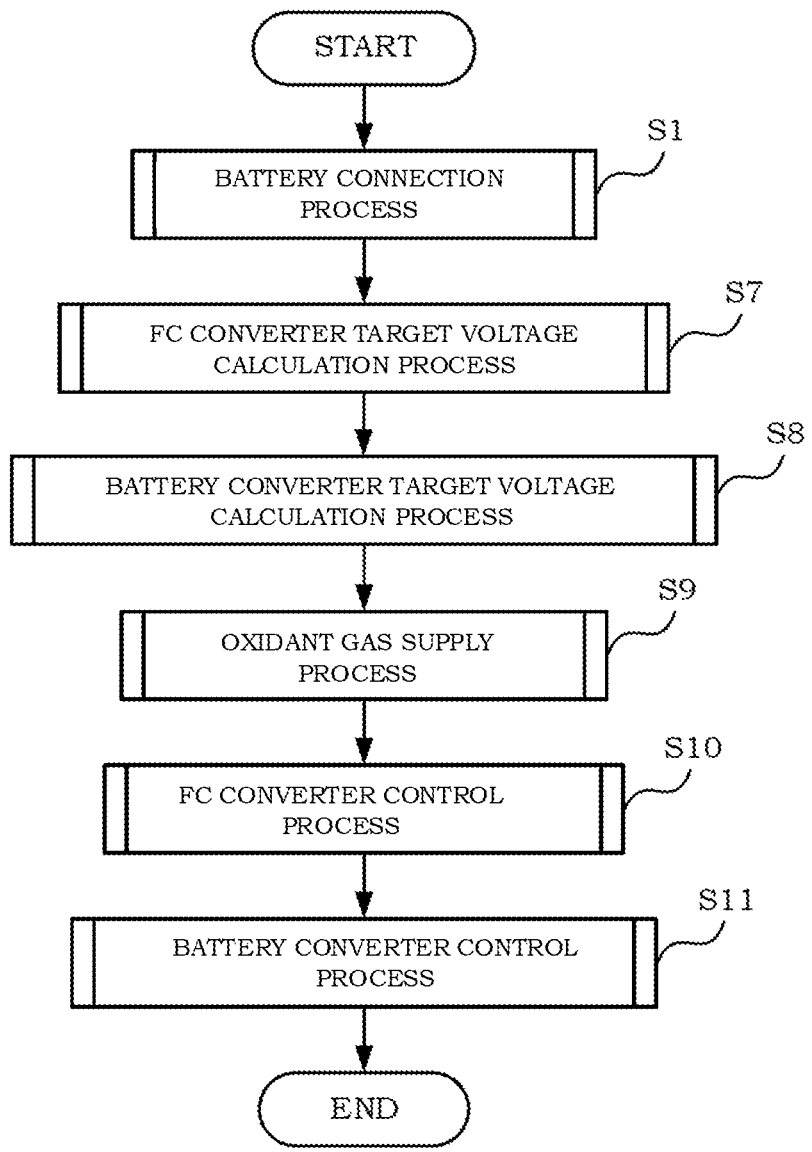
FIG. 12 is a flow chart showing a system startup process performed by a fuel cell controller, a fuel cell DC/DC converter controller and a battery DC/DC converter controller in a second embodiment of the present invention.

FIG. 12 is a flow chart (main flow chart) showing a system startup process performed by a fuel cell controller 10, the fuel cell DC/DC converter controller 4 and the battery DC/DC converter controller 7 in the second embodiment of the present invention. The same Steps as in the first embodiment are denoted by the same Step numbers.

A control according to this flow chart is executed during the startup of the power conditioning system 100 of the present embodiment. Here, the "startup of the power conditioning system 100" includes not only the startup of the power conditioning system 100 including the fuel cell stack 1, but also a return from idling stop performed when a vehicle is stopped such as the waiting of the vehicle at a traffic light as in the first embodiment. It should be noted that a sequence of Steps may be changed within a non-contradictory range.

First, the fuel cell controller 10 performs a battery connection process for connecting a battery 20 in the power conditioning system 100 (Step S1). Subsequently, the fuel cell controller 10 performs an FC converter target voltage calculation process for calculating a target voltage of a DC/DC converter 5 for the fuel cell stack 1 (Step S7).

Subsequently, the fuel cell controller 10 performs a battery converter target voltage calculation process for calculating a target voltage of a DC/DC converter 8 for the battery 20 (Step S8). Subsequently, the fuel cell controller 10 performs an oxidant gas supply process for supplying oxidant gas during the startup of the power conditioning system 100 (Step S9).

Subsequently, the fuel cell DC/DC converter controller 4 performs an FC converter control process for controlling the DC/DC converter 5 during or after the startup of the power conditioning system 100 (Step S10) and the battery DC/DC converter controller 7 performs a battery converter control process for controlling the DC/DC converter 8 during or after the startup of the power conditioning system 100 (Step S11).

Then, the fuel cell controller 10, the fuel cell DC/DC converter controller 4 and the battery DC/DC converter controller 7 end the system startup process in the present embodiment shown in FIG. 12.

Next, each of subroutines of FIG. 12 different from those of the first embodiment is described with reference to a flow chart.

Figure 13:
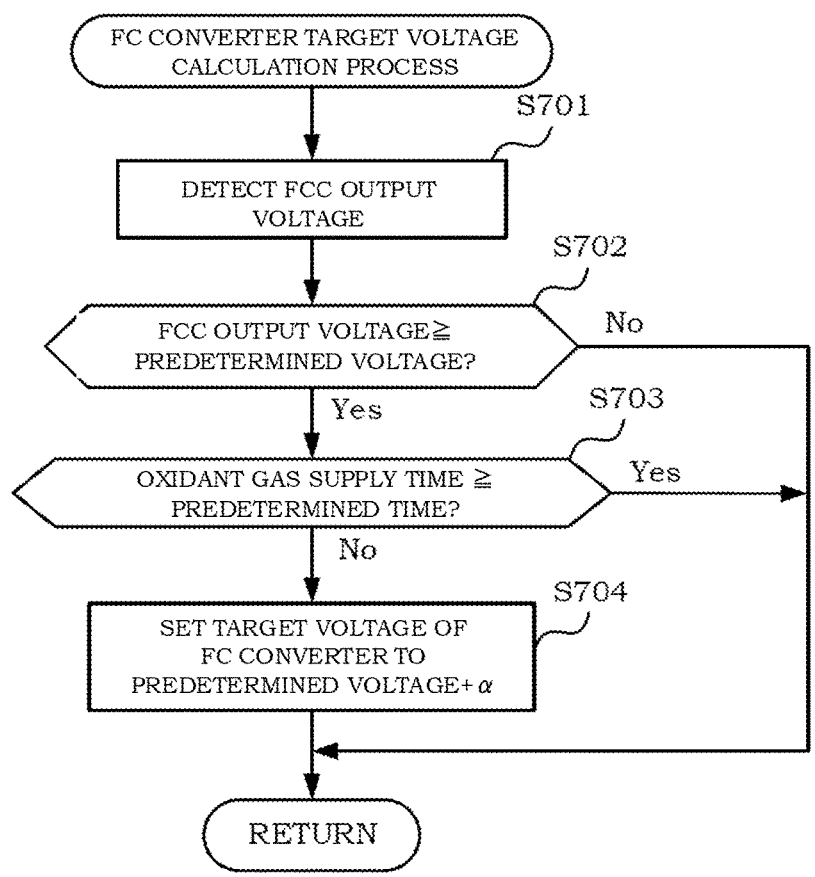
FIG. 13 is a flow chart showing an FC converter target voltage calculation process performed by the fuel cell controller in the second embodiment.

FIG. 13 is a flow chart showing the FC converter target voltage calculation process performed by the fuel cell controller 10 in the second embodiment. In the present embodiment, the output-side voltage of the fuel cell stack 1 is set to the predetermined voltage by a normal startup process without directly coupling the DC/DC converter 5 for the fuel cell stack 1 during the startup of the power conditioning system 100.

In this FC converter target voltage calculation process, the fuel cell controller 10 first detects the output voltage of the DC/DC converter 5 using a voltage sensor 65 (Step S701). Then, the fuel cell controller 10 determines whether or not that output voltage is equal to or higher than the predetermined voltage (Step S702). If the output voltage is determined to be below the predetermined voltage, the fuel cell controller 10 ends this FC converter target voltage calculation process and returns to the main process flow.

On the other hand, if the output voltage is determined to be equal to or higher than the predetermined voltage, the fuel cell controller 10 further determines whether or not a supply time of the oxidant gas is equal to or longer than a predetermined time (Step S703). If the supply time of the oxidant gas is determined to be equal to or longer than the predetermined time, the fuel cell controller 10 ends this FC converter target voltage calculation process and returns to the main process flow.

On the other hand, if the supply time of the oxidant gas is determined to be shorter than the predetermined time, the fuel cell controller 10 sets a target voltage (target output voltage) of the DC/DC converter 5 to the predetermined voltage+α (Step S704), ends this FC converter target voltage calculation process and returns to the main process flow.

Here, the margin α is briefly described. The margin α in the determination step of Step S704 is determined in advance through an experiment or the like in consideration of detection errors of the voltage sensor 65 on the output side of the DC/DC converter 5 and a voltage sensor 69 on the output side of the DC/DC converter 8, control responsiveness of the DC/DC converter 5 and the like. In the present embodiment, the margin α is, for example, 10 V.

Figure 14:
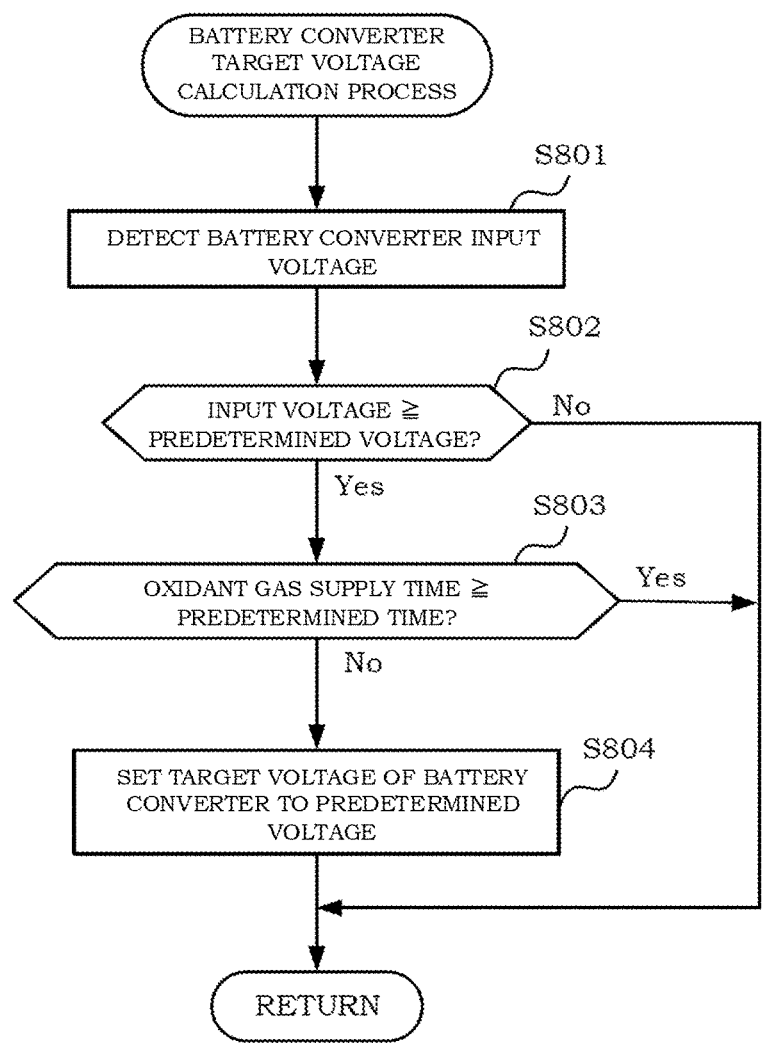
FIG. 14 is a flow chart showing a battery converter target voltage calculation process performed by the fuel cell controller in the second embodiment.

FIG. 14 is a flow chart showing the battery converter target voltage calculation process performed by the fuel cell controller 10 in the second embodiment.

In this battery converter target voltage calculation process, the fuel cell controller 10 first detects a voltage on the input side (input voltage) of the DC/DC converter 8 using a voltage sensor 67 (Step S801). Then, the fuel cell controller 10 determines whether or not this input voltage is equal to or higher than the predetermined voltage (Step S802).

If the input voltage is determined to be below the predetermined voltage, the fuel cell controller 10 ends this battery converter target voltage calculation process. On the other hand, if the input voltage is determined to be equal to or higher than the predetermined voltage, the fuel cell controller 10 determines whether or not the oxidant gas supply time is equal to or longer than the predetermined time (Step S803).

If the oxidant gas supply time is determined to be equal to or longer than the predetermined time, the fuel cell controller 10 judges that the fuel cell stack 1 has been started, ends this battery converter target voltage calculation process and returns to the main process flow.

On the other hand, if the oxidant gas supply time is determined to be shorter than the predetermined time, the fuel cell controller 10 sets a target voltage (target output voltage) of the DC/DC converter 8 for the battery 20 to the predetermined voltage, ends this battery converter target voltage calculation process and returns to the main process flow.

Figure 15:
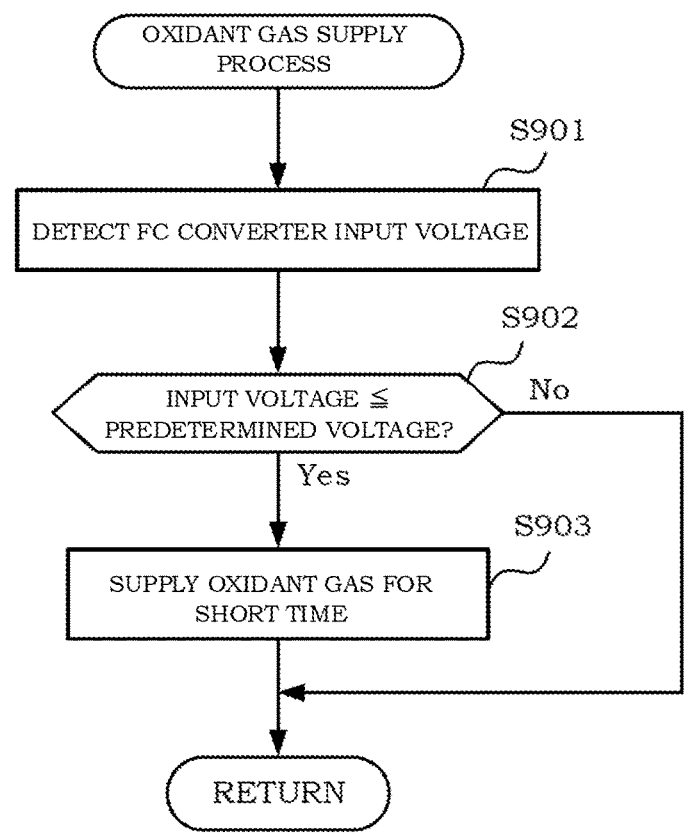
FIG. 15 is a flow chart showing an oxidant gas supply process performed by the fuel cell controller in the second embodiment, and FIG. 16 are flow charts showing an FC converter control process and a battery converter control process in the second embodiment.

FIG. 15 is a flow chart showing the oxidant gas supply process performed by the fuel cell controller 10 in the second embodiment.

In this oxidant gas supply process, the fuel cell controller 10 first detects an input voltage of the DC/DC converter 5 for the fuel cell stack 1 (Step S901). Then, the fuel cell controller 10 determines whether or not that input voltage is equal to or lower than the predetermined voltage (Step S902).

If the input voltage is determined to be higher than the predetermined voltage, the fuel cell controller 10 ends this oxidant gas supply process and returns to the main process flow. On the other hand, if the input voltage is determined to be equal to or lower than the predetermined voltage, the fuel cell controller 10 judges the shortage of the oxidant gas in the fuel cell stack 1, supplies the oxidant gas to the fuel cell stack 1 for a short time (Step S903), ends this oxidant gas supply process and returns to the main process flow. It should be noted that although each control is described focusing on the oxidant gas in the present embodiment, fuel gas (anode gas) is also supplied if necessary in the power conditioning system 100.

FIG. 16 are flow charts showing an FC converter control process and a battery converter control process in the second embodiment. FIG. 16(a) is a flow chart showing the FC converter control process performed by the fuel cell DC/DC converter controller 4.

In the present embodiment, unlike the first embodiment, the fuel cell controller 10 performs only an FCC voltage control process by the fuel cell DC/DC converter controller 4 in this FC converter control process (Step S506). It should be noted that since this FCC voltage control process is similar to the process of FIG. 9 described in the first embodiment, this process is not described here.

FIG. 16(b) is a flow chart showing a battery converter control process performed by the battery DC/DC converter controller 7. Similarly to the FC converter control process, in the present embodiment, the fuel cell controller 10 performs only a BC voltage control process by the battery DC/DC converter controller 7 in this battery converter control process (Step S607). It should be noted that since this BC voltage control process is similar to the process of FIG. 11 described in the first embodiment, this process is not described here.

As described above, in the power conditioning system 100 of the present embodiment, the DC/DC converter 5 for the fuel cell stack 1 includes a plurality of switching elements 52, 54 for stepping up and down the output voltage of the fuel cell stack 1, and a converter direct coupling unit 15 is configured to directly couple the fuel cell converter by setting the output-side voltage of this DC/DC converter 8 for the battery 20 to the predetermined voltage by the DC/DC converter 8 and setting the input-side voltage (voltage detected by a voltage sensor 62) at a voltage value higher than the output-side voltage (voltage detected by the voltage sensor 65) of the DC/DC converter 5 for the fuel cell stack 1 by this DC/DC converter 5. Since the power conditioning system 100 of the present embodiment is configured as just described, an ON-duty of the switching element 52 on a step-down side reaches 100%, whereby the DC/DC converter 5 is directly coupled.

In the present embodiment, by configuring the power conditioning system 100 as just described, effects similar to those of the first embodiment can be achieved without requiring special control modes unlike the first embodiment.

Although the embodiments of the present invention have been described above, the above embodiments are merely an illustration of some application examples of the present invention and not intended to limit the technical scope of the present invention to the specific configurations of the above embodiments.

In the above embodiments, a case where single-phase unidirectional DC/DC converters are used as the DC/DC converter 5 for the fuel cell stack 1 and the DC/DC converter 8 for the battery 20 have been described. However, the present invention is not limited to such a configuration. Bidirectional single-phase DC/DC converters may be, for example, used or unidirectional or bidirectional multi-phase DC/DC converters may be used as the DC/DC converters 5, 8. By adjusting the input-side voltage of the DC/DC converter 5 to the predetermined voltage in accordance with the startup of the fuel cell stack 1, the effects of the present invention as described above can be achieved.

Further, in the above first embodiment, the capacitor 64 located on the output side of the DC/DC converter 5 for the fuel cell stack 1 is charged to the predetermined voltage (Step S203) by stepping up the output voltage of the battery 20 to the predetermined voltage by the DC/DC converter 8, the capacitor 63 located on the input side of the DC/DC converter 5 is charged to the predetermined voltage (Step S402) by directly coupling the DC/DC converter 5 (Steps S301, S302) after the elapse of the predetermined time after the output-side voltage of the DC/DC converter 5, i.e. a charging voltage of this capacitor 64, reaches the predetermined voltage or higher (Step S204), and the fuel gas and the oxidant gas are supplied to the fuel cell stack 1 as the fuel cell stack 1 is connected to the power conditioning system 100. Specifically, in the first embodiment, the fuel cell stack 1 is started by starting the supply of the fuel gas and the oxidant gas to the fuel cell stack 1 after the input voltage of the DC/DC converter 5 reaches the predetermined voltage following the startup of the power conditioning system 100.

However, the present invention is not limited to such a startup timing. For example, the supply of the fuel gas and the oxidant gas to the fuel cell stack 1 may be started by starting the cathode compressor for supplying the oxidant gas to the fuel cell stack 1 after the startup of the power conditioning system 100, and the fuel cell stack 1 may be started substantially simultaneously with the startup of the power conditioning system 100. Also in this case, since being directly coupled, the DC/DC converter 5 does not perform the step-up operation. Thus, hunting by the DC/DC converter 5 as described above can be prevented.

The invention claimed is:

1. A power conditioning system with two converters, comprising:
    a fuel cell to be connected to a load;
    a fuel cell converter connected between the fuel cell and the load, the fuel cell converter converting an output voltage of the fuel cell at a predetermined required voltage ratio;
    a battery connected in parallel with the fuel cell with respect to the load, the battery serving as a power supply source different from the fuel cell;
    a battery converter connected between the battery and the load, the battery converter converting an output voltage of the battery at a predetermined required voltage ratio;
    a converter direct coupling unit configured to directly couple an input side and an output side of the fuel cell converter during startup of the power conditioning system; and
    a fuel cell output voltage increasing unit configured to increase the output voltage of the fuel cell to a predetermined voltage by supplying oxidant gas during startup of the fuel cell.

2. The power conditioning system according to claim 1, further comprising:
    a converter input voltage adjusting unit configured to adjust an input-side voltage of the fuel cell converter to the predetermined voltage before the output voltage of the fuel cell is increased to the predetermined voltage by the fuel cell output voltage increasing unit.

3. The power conditioning system according to claim 2, wherein:
    the converter input voltage adjusting unit adjusts the input-side voltage of the fuel cell converter to the predetermined voltage using stored power of the battery by the battery converter and the converter direct coupling unit.

4. The power conditioning system according to claim 2, wherein:
    the converter input voltage adjusting unit stops a function of the converter direct coupling unit and adjusts the input-side voltage of the fuel cell converter to the predetermined voltage using stored power of the battery by the battery converter and the fuel cell converter.

5. The power conditioning system according to claim 1, further comprising:
    a current sensor configured to detect an output current of the fuel cell during the startup of the fuel cell; and
    an output current determining unit configured to determine whether or not the output current detected by the current sensor has been increased to a predetermined value or larger after the startup of the fuel cell,
    wherein a voltage control gain of the battery converter is increased more when the output current is determined to have been increased to the predetermined value or larger by the output current determining unit than when the output current is below the predetermined value.

6. The power conditioning system according to claim 1, wherein:
    the converter direct coupling unit directly couples the fuel cell converter and simultaneously increases an input-side voltage and an output-side voltage of the fuel cell converter to the predetermined voltage using stored power of the battery during the startup of the power conditioning system.

7. The power conditioning system according to claim 1, wherein:
    the fuel cell converter includes a plurality of switching elements configured to step up and down the output voltage of the fuel cell; and
    the converter direct coupling unit directly couples the fuel cell converter by setting an output-side voltage of the fuel cell converter to the predetermined voltage by the battery converter and setting an input-side voltage to a voltage value higher than the output-side voltage of the fuel cell converter by the fuel cell converter.

8. A control method for a power conditioning system with:
    a fuel cell to be connected to a load;
    a fuel cell converter connected between the fuel cell and the load, the fuel cell converter converting an output voltage of the fuel cell at a predetermined required voltage ratio;
    a battery serving as a power supply source different from the fuel cell; and a battery converter connected between the battery and the load, the battery converter converting an output voltage of the battery at a predetermined required voltage ratio;

the control method comprising:

directly coupling an input side and an output side of the fuel cell converter; and increasing the output voltage of the fuel cell to a predetermined voltage by supplying oxidant gas during startup of the fuel cell.

* * * * *